US012556643B2

(12) United States Patent
Leskanic et al.

(10) Patent No.: US 12,556,643 B2
(45) Date of Patent: Feb. 17, 2026

(54) COLOR MANAGEMENT SYSTEM FOR APPLICATION OF COLOR TO SUBSTRATES

(71) Applicant: AirDye Intellectual Property LLC, New York, NY (US)

(72) Inventors: Jesse Leskanic, Gaffney, SC (US); Andy Parrott, New York, NY (US); Patrick Tak Fu Chong, Mount Arlington, NJ (US); Evan Randolph Smith, New York, NY (US); Daniel J. Fuller, Beacon, NY (US)

(73) Assignee: Airdye Intellectual Property LLC, New York, NY (US)

( * ) Notice: Subject to any disclaimer, the term of this patent is extended or adjusted under 35 U.S.C. 154(b) by 95 days.

(21) Appl. No.: 18/408,966

(22) Filed: Jan. 10, 2024

(65) Prior Publication Data

US 2024/0223713 A1   Jul. 4, 2024

Related U.S. Application Data

(63) Continuation of application No. 17/848,800, filed on Jun. 24, 2022, now Pat. No. 11,909,940, which is a
(Continued)

(51) Int. Cl.
| | | |
|---|---|---|
| *H04N 1/60* | (2006.01) | |
| *G01J 3/28* | (2006.01) | |
| *G01J 3/46* | (2006.01) | |

(52) U.S. Cl.
CPC ............ *H04N 1/603* (2013.01); *G01J 3/2823* (2013.01); *G01J 3/463* (2013.01); *H04N 1/6041* (2013.01);
(Continued)

(58) Field of Classification Search
CPC .... H04N 1/603; H04N 1/6041; H04N 1/6052; H04N 1/6075; H04N 1/6086;
(Continued)

(56) References Cited

U.S. PATENT DOCUMENTS

| | | | |
|---|---|---|---|
| 5,602,970 | A | 2/1997 | Janser |
| 5,668,633 | A | 9/1997 | Cheetam et al. |

(Continued)

FOREIGN PATENT DOCUMENTS

| | | |
|---|---|---|
| CN | 1155706 A | 7/1997 |
| CN | 101019116 A | 8/2007 |

(Continued)

OTHER PUBLICATIONS

Second Office Action mailed for Chinese patent application No. 201580029706.3, Jan. 28, 2019, 13 Pages.
(Continued)

*Primary Examiner* — Nicholas Pachol
(74) *Attorney, Agent, or Firm* — IP Spring

(57) ABSTRACT

Methods, systems and computer readable media for color management are described. In some implementations, the method can include accessing one or more buildup curves associated with a combination of a substrate, one or more colorants and a colorant dispenser. The method can also include accessing a design file specifying a design and including one or more layer files each specifying a layer color. The method can further include generating, for each layer color, a corresponding colorization recipe based on the one or more buildup curves. The method can also include creating a production job instruction/metadata file having a link to the design instruction/metadata file and including parameters associated with the colorant dispensing job to be carried out using the design instruction/metadata file.

20 Claims, 17 Drawing Sheets

Related U.S. Application Data continuation of application No. 16/799,771, filed on Feb. 24, 2020, now Pat. No. 11,381,711, which is a continuation of application No. 15/301,364, filed as application No. PCT/US2015/023887 on Apr. 1, 2015, now Pat. No. 10,574,859.

(60) Provisional application No. 61/974,093, filed on Apr. 2, 2014.

(52) U.S. Cl.
CPC ......... *H04N 1/6052* (2013.01); *H04N 1/6075* (2013.01); *H04N 1/6086* (2013.01); *H04N 1/6097* (2013.01); *H04N 2201/3256* (2013.01)

(58) Field of Classification Search
CPC .......... H04N 1/6097; H04N 2201/3256; G01J 3/2823; G01J 3/463
See application file for complete search history.

(56) References Cited

U.S. PATENT DOCUMENTS

| | | | |
|---|---|---|---|
| 6,022,104 A | 2/2000 | Lin et al. | |
| 6,483,607 B1 | 11/2002 | Capelle et al. | |
| 8,045,219 B2 | 10/2011 | Pruden et al. | |
| 8,456,720 B2 | 6/2013 | Mestha et al. | |
| 2002/0042842 A1 | 4/2002 | Lawn et al. | |
| 2002/0131063 A1* | 9/2002 | Krabbenhoft | H04N 1/603 358/1.9 |
| 2002/0145213 A1 | 10/2002 | Liu et al. | |
| 2002/0193956 A1* | 12/2002 | Van de Capelle | G01N 33/32 702/81 |
| 2003/0053134 A1* | 3/2003 | Haro | G06K 15/00 358/1.9 |
| 2003/0123072 A1 | 7/2003 | Spronk | |
| 2004/0012647 A1 | 1/2004 | Sanger | |
| 2004/0036896 A1* | 2/2004 | Yamauchi | H04N 1/295 358/1.9 |
| 2004/0085326 A1* | 5/2004 | Agar | H04N 1/603 345/589 |
| 2004/0136018 A1* | 7/2004 | Krabbenhoft | H04N 1/6022 358/1.9 |
| 2004/0150684 A1 | 8/2004 | Sanger et al. | |
| 2004/0150844 A1 | 8/2004 | Sanger | |
| 2005/0174449 A1* | 8/2005 | Matsuzaka | H04N 1/32128 348/240.3 |
| 2005/0213127 A1* | 9/2005 | Hoshino | H04N 1/603 358/1.9 |
| 2006/0023232 A1* | 2/2006 | Chan | G01J 3/46 358/1.9 |
| 2008/0037069 A1* | 2/2008 | Mestha | H04N 1/00087 358/3.23 |
| 2008/0192273 A1 | 8/2008 | Rich | |
| 2008/0246982 A1* | 10/2008 | Kaneko | H04N 1/603 358/1.9 |
| 2008/0297813 A1 | 12/2008 | Sanger et al. | |
| 2009/0207458 A1 | 8/2009 | Doggett, III et al. | |
| 2010/0265522 A1 | 10/2010 | Dalal et al. | |
| 2011/0038010 A1 | 2/2011 | Chen et al. | |
| 2011/0149312 A1 | 6/2011 | Mestha et al. | |
| 2011/0234660 A1* | 9/2011 | Yoshida | B41J 2/2107 347/9 |
| 2012/0092359 A1* | 4/2012 | O'Brien-Strain | H04N 1/6041 345/589 |
| 2012/0327434 A1 | 12/2012 | Gil et al. | |
| 2013/0021422 A1 | 1/2013 | Chen et al. | |
| 2013/0182266 A1 | 7/2013 | Fu et al. | |
| 2013/0258364 A1* | 10/2013 | Ito | H04N 1/603 358/1.9 |
| 2014/0111832 A1* | 4/2014 | Hayashi | H04N 1/603 358/3.06 |
| 2016/0155367 A1* | 6/2016 | Rich | C09D 11/037 283/81 |
| 2016/0236478 A1 | 8/2016 | Carnelli et al. | |
| 2017/0034398 A1* | 2/2017 | Garcia Garcia | H04N 1/00058 |
| 2018/0013928 A1* | 1/2018 | Shaw | H04N 1/6058 |

FOREIGN PATENT DOCUMENTS

| | | |
|---|---|---|
| CN | 101939977 | 1/2011 |
| CN | 102016401 | 4/2011 |
| EP | 0 833 219 | 4/1998 |
| WO | WO 2007/135544 | 11/2007 |

OTHER PUBLICATIONS

First Office Action mailed for Chinese patent application No. 201580029706.3, Jun. 25, 2018, 15 pages.
Third Office Action mailed for Chinese patent application No. 201580029706.3, Nov. 4, 2019, 12 pages.
Office Action mailed for Russian Patent Application No. 2016143116, Oct. 17, 2018, 6 Pages.
Notice of Decision to Grant mailed for Russian patent application No. 2016143116, Sep. 24, 2019, 8 pages.
"Brazilian Office Action in Brazilian Application No. 112016022978-9", May 22, 2023, 7 pages.
"Communication Pursuant to Article 94(3) EPC in Application No. 15 774 214.9", , 6 Pages.
"Decision of Reexamination in Chinese Application No. 201580029706.3", Oct. 21, 2022, 15 pages.
"Decision of Rejection in CN Application No. 201480029706.3", Jan. 27, 2021, 6 Pages.
First Examination Report in IN Application No. 202118008018 , Feb. 3, 2022, 7 Pages.
"First Office Action in MX Application No. MX/a/2016/013002", Jul. 15, 2020, 3 Pages.
"Fourth Office Action in Chinese Application No. 20150029706.3", Jul. 2, 2020, 10 pages.
"International Search Report in PCT/US2015/023887 filed Apr. 1, 2015", Aug. 20, 2015, 4 Pages.
"Notice of Allowance in MX Application No. MX/a/2016/013002", Feb. 24, 2021, 2 pages.
"Notice of Hearing in IN Application No. 202118008018", Apr. 21, 2023, 3 Pages.
"Notice of Results of Examination in VN Application No. 1-2016-04208", Mar. 18, 2021, 4 Pages.
"Preliminary Rejection in KR Application No. 10-2016-7030661", May 20, 2021, 14 pages.
"Summons to attend oral proceedings n EP Application No. 15774214.9", Oct. 7, 2020, 7 pages.
"Written Opinion of ISA in International Application No. PCT/US2015/023887 filed Apr. 1, 2015", Aug. 20, 2015, 12 pages.
Brazilian Patent Office, Preliminary Office Action mailed for application No. 112016022978-9, Aug. 25, 2020.
EPO, "Extended European Search Report in Application No. 15774214.9", Oct. 13, 2017, 9 pages.
Metnam Patent Office, Substantive Examination Report mailed for application No. 1-2016-04208, Aug. 14, 2020, 2 pages.

\* cited by examiner

COLOR MANAGEMENT SYSTEM FOR APPLICATION OF COLOR TO SUBSTRATES

RELATED APPLICATIONS

This application is a continuation of U.S. application Ser. No. 17/848,800, entitled "Color Management System For Application of Color to Substrates", and filed Jun. 24, 2022, which is a continuation of U.S. application Ser. No. 16/799,771, entitled "Color Management System For Application of Color To Substrates", and filed Feb. 24, 2020, now U.S. Pat. No. 11,381,711, Issued Jul. 5, 2022, which is a continuation of U.S. application Ser. No. 15/301,364, entitled "Color Management System For Application of Color To Substrates", and filed Mar. 15, 2017, now U.S. Pat. No. 10,574,859, Issued Feb. 25, 2020, which is a 371 of International Application No. US2015/023887, entitled "Color Management", and filed Apr. 1, 2015, which claims the benefit of U.S. Provisional Application No. 61/974,093, entitled "Systems and Methods for Color Management", and filed on Apr. 2, 2014, which is incorporated herein by reference in its entirety.

BACKGROUND

There have been attempts made to manage color in processes that include dispensing colorants. For example, the International Color Consortium (ICC) specifications (e.g., ICC.1:2010 version 4.3.0.0) for cross-platform color management systems are widely used in some color related industries such as publishing. The ICC specification is referred to in many international and other standards to address challenges in color management, for example, when printing the same document may look different when printed on different printers, viewed on different monitors, or viewed under different quality of lightings. Such challenges can be caused or aggravated by a variety of factors including different device color gamuts (e.g., range of realizable colors), light source metamerism and observer vision metamerism. To address these problems, colorimetric and/or spectral transformation can be used to map the colors from one device color space (e.g., source device) to another device color space (e.g., destination device).

The ICC has adopted a device-independent color transformation. For each device, there is a transformation from that device to a standard color space, e.g., the International Commission on Illumination (CIE) standard color space CIEXYZ/CIELAB (or XYZ/L*a*b*). Transformations have source-to-standard color space or destination-to-standard color space information.

In a typical ICC workflow, the transforms from device to the standard color space (i.e. profile connection space (PCS)) are embedded in the ICC Source Profile or ICC Destination Profile. An ICC profile may describe unique color characteristics of a device and may contain a transform from a device to the PCS. ICC profiles may be developed for devices such as input devices (e.g., scanners, digital cameras, or the like), output devices (e.g., printers, film recorders, or the like), and display devices (e.g., LCD monitors, projectors, or the like).

For example, display calibration and characterization (or profiling) can be an important aspect of a color managed workflow. Calibration is a process whereby a device is brought to a standard state (e.g., a color temperature of 6500K and gamma of 2.2) and the device is characterized by determining how the monitor represents or reproduces color. The monitor can be characterized, for example, by measuring how the monitor displays known color values. An ICC profile can then be created that defines a quantitative relationship between device dependent RGB values and the CIE device independent XYZ/L*a*b* values. In a similar manner, an ICC profile for a CMYK printer can provide a quantitative relationship between device dependent CMYK values and the CIE device independent XYZ/L*a*b* values. Such relationships may be established with a Look Up Table (LUT) to which interpolation is applied that are pre-calculated or the use of color matrices to carry out color transformations on the fly via the Profile Connection Space (PCS) based on a CIE standard color space (XYZ/L*a*b*).

In another example, a color transformation can define the transform from an RGB digital camera input device to a CMYK inkjet output device via the PCS based on a CIE standard color space (XYZ/L*a*b*). A printer profile can be generated by printing out a series of patches and then measure them with a color measuring device. In this way, the printer profile can be used to convert a CMYK device color value into the PCS XYZ/L*a*b* value, and vice versa.

In order to perform a transform from the camera RGB values into CMYK values for the printer, there may be two tables (A to B and B to A) needed. For example, in an A to B conversion, an image profile embedded with a digital camera profile allows the conversion from device color (RGB) to CIE color specification (L*a*b*). On the other hand, in a B to A conversion, the converted CIE color specification (L*a*b*) can be converted into a display device color specification using a color monitor profile (e.g. RGB profile) which can be created via a monitor calibration color matrix. Alternatively, the vision color can be converted into an inkjet printer device color (e.g., CYMK) using the inkjet printer profile. During the process in B to A conversion, some source colors may lie beyond the destination device gamut, so those PCS colors will be compressed into the device gamut, which can result in a difference between the converted device colors and the source CIE color specifications. This is known as the color gamut mapping process.

The ICC cross platform color management system was approved as an International Standard, ISO 15076-1:2010 "Image technology color management—Architecture, profile format and data structure". ISO 15076-1:2010 specifies a color profile format and describes the architecture within which it can operate. This architecture supports the exchange of information which specifies the intended color image processing of digital data. The required reference color spaces and the data structures (tags) are also specified.

The ICC cross platform color management system may be subject to one or more challenges, problems or limitations. For example, color matching accuracy may be a challenge as the inherent method and algorithms that manage this translation and interpretation can lead to inaccuracies that may be unacceptable in some industries, such as textile printing, for example. A properly managed ICC color workflow may specify that as long as 80% of the colors produced are within a delta error (DE) tolerance of 3-6 DE with not more than 3% exceeding a 12 DE, the process is within tolerance. Delta Error (DE) is a numeric description of the amount of color error that a produced color is from the desired or "standard" color, e.g., CMC(1:c) Colour Difference Formula. There are industry accepted formulas for calculating the DE value between 2 colors. In the textile industry the normal maximum tolerance is 1.5 units of DE with the normal deviation being a "1" or less. Some products may require a color accuracy of 0.5 DE units or less. It may be difficult or even impossible to achieve color accuracies in this range within an ICC color managed workflow. One reason for this limitation may be that the ICC color managed workflow was not intended to achieve the level of color accuracy that is often required in the textile industry. The ICC color managed workflow may have been designed for the aesthetically pleasing and somewhat color accurate reproduction of photo realistic images (e.g., images commonly used in graphic arts). It may not have been designed for the accurate reproduction of "spot" color as the textile industry requires.

In addition, in a traditional ICC managed color workflow, users may have limited options for controlling the accuracy of the color. Indeed, the user may only be capable of controlling the accuracy of the color by manipulating the image itself. In other words, the data file itself must be adjusted or "shifted" to get the output color closer to the tolerance that is required. By doing this, the on screen representation may change and the user may no longer have an accurate representation of the final desired product. This may lead to extreme difficulties during the color development and matching process.

Another limitation of the ICC workflow involves the default ICC illuminant. By default, the ICC color managed system works in a D50 illuminated workflow. D50 is the CIE Standard Illuminant at a co-related color temperature of 5000K with defined spectral power distribution that is used to view the final product under. D50 is a commonly used and accepted industry illuminant for graphic arts. A textile industry standard for daylight is D65, but in the printing industry and graphic arts areas, D50 is commonly used as the daylight standard. For example, the textile industry has adopted the D65 illuminant as a common standard. By definition, the CIE and ISO state that the "CIE standard illuminant D65 should be used in all colorimetric calculations requiring representative daylight, unless there are specific reasons for using a different illuminant." (ISO 11664-2:2007(E)/CIE S 014-2/E:2006). Though mathematical models have been developed to allow D50 profiles to be used in a D65 environment, these mathematical conversion models may be themselves prone to introducing errors and may be, in worst case scenarios, approximations of the correct values. This can lead to further inaccuracies in the produced color that may be unacceptable in the textile supply chain.

Yet another limitation of the ICC workflow involves profile chart accuracy. In particular, this limitation is associated with the "profile chart" that is typically printed to create a printer color profile. This involves the physical printing of industry defined color patches that represent the permutations of the colorants (e.g., dyes/inks) that are available in the print machine. This chart normally encompasses from 800 to 2000 unique colors that the user prints. These color patches are created by software sending unique values to the printer. The printed patches are then measured with a spectrophotometer. By doing this, a look up table (LUT) can be created that correlates the "raw" device values sent to the printer to a known color value. The profiling software then will take these related values and populate a 3 dimensional color space that is representative of the printer. A potential problem with this method can be that the color space that the printer is capable of representing can potentially include a large number (e.g., millions) of colors and therefore the color engine that uses the profile must "interpolate" between the known colors from the profile chart to predict the values for an unknown color. This interpolation may be inaccurate at its best and its accuracy may be heavily dependent on the number of patches printed, the number of primaries (e.g., colorants, inks, dyes or pigments) in the digital color dispensing machine, and the accuracy of the color readings taken by the operator. One way to increase the accuracy of this process is to increase the number of color patches that are utilized in the three dimensional color space. This can presently be achieved by printing a much higher number of patches on the profile chart. This may not be practical as the time required to accurately measure the number of required patches and the accuracy of these additional readings may make the profiling process even less accurate.

Still another limitation involves metamerism. In colorimetry, metamerism refers to a pair of objects having different spectral reflectance curves but the same colorimetric specification (i.e. color match) for a given set of conditions. If, upon a change in illumination, the pair of objects no longer match, then the pair are said to exhibit illuminant/source metamerism. If upon a change in observer, the pair of objects no longer match, then the pair are said to exhibit observer metamerism. A spectral power distribution describes the proportion of total light emitted, transmitted, or reflected by a color sample at every visible wavelength; it precisely defines the light from any physical stimulus. However, the human eye contains only three color receptors (i.e., three types of cone cells), which means that all colors are reduced to three sensory quantities, called the tristimulus values (X, Y, Z). Metamerism occurs because each type of cone responds to the cumulative energy from a broad range of wavelengths, so that different combinations of light across all wavelengths can produce an equivalent receptor response and the same tristimulus values or color sensation.

It is not unusual for the textile industry to require color matching to be done under different illuminants simultaneously. This is to allow a sample to meet the color matching requirements to a standard color as it is moved through the supply chain and retail environments with a wide variety of illuminations with different lighting qualities. This type of color matching is called non-metameric color matches. This capability may be difficult or impossible under any circumstance achievable in an ICC color managed workflow since the ICC workflow is based on colorimetric quantities as opposed to spectral quantities.

Another limitation relates to visible wavelength range. Because the ICC platform is built on the colorimetry foundation, the applications of the ICC workflow may be restricted to the visible wavelength range. In other words, useful industrial applications in the ultraviolet and infrared wavelength ranges, such as in military camouflage applications, may not be applied.

In some conventional color matching operations for color dispensing systems one or more turbid medium theory models may be used for calculating optical properties (e.g., absorption and scattering coefficients) of materials (e.g., substrate and colorants). The Kubelka-Munk theory is one widely used for turbid medium models.

There may be one or more challenges, problems or limitations with conventional applications of turbid medium theory models, including Kubelka-Munk, in color matching for digital colorant dispensing systems. For example, some turbid medium theory models may involve relatively complex mathematical operations and may require substantial computation capacity or time to carry out the mathematical operations. Turbid medium theory models have been applied to certain industries (e.g., textiles) in a conventional manner on a "color by color" basis and may be restricted to less than 20 colors per design colorway for colorant dispensing operations. It may not be practical or economically feasible (e.g., in terms of computation time) to perform color matching for each pixel of a print image being configured for digital colorant dispensing using a turbid medium theory model, such as Kubelka-Munk, in a conventional manner.

Another potential limitation of some turbid medium theory models relates to "fall on colors." Fall on color refers to color characteristics of colorants dispensed in layers in which a color of one layer may be applied over (or fall on) a color of another layer resulting in a color having properties different than either of the individual layer colors. Some turbid medium theory models may have no practical method to predict the resulting color of multiple colors falling on top of each other as may occur in a typical color dispensing operation (e.g., a textile printing operation) where color separated print colors are applied one by one in sequence (e.g., via a corresponding print screen) in which colors may or may not overlap each other.

Another potential limitation of some turbid medium theory models may be that some of the models offer no practical method to predict tonal colors, in a color consistent manner, for the potentially large number of pixels for a typical print with tonal design. In addition, some of the turbid theory medium models may offer no practical method to predict a hue shift that may occur as part of tonal development.

In yet another potential limitation, some turbid medium theory models may provide little or no way to address matching a color target that is outside a color gamut limit of a colorant database. In some conventional colorant dispensing environments, there may be multiple colorant dispensers that are the same or different from each other. There may be color differences in the colors produced by each colorant dispenser.

Some implementations were conceived in light of the above-mentioned challenges, problems and limitations, among other things.

SUMMARY

Some implementations can include a color system comprising one or more output devices, and a color management system having one or more processors and being coupled to the one or more output devices via a network. The color management system can be configured to determine a target color and corresponding optical information of the target color, and match the optical information corresponding to the target color with predicted optical information of a colorant recipe, the predicted optical information of the colorant recipe being based on output device characterization information corresponding to a combination of an output device, an output device operational mode, a substrate, one or more colorants and one or more illuminants/sources and/or one or more observer vision characteristics. The color management system also being configured to communicate an instruction/metadata file containing the colorant recipe and optical information associated with the colorant recipe to the one or more output devices, and cause the output device to produce a colored article bearing a color generated according to the colorant recipe.

The color management system can be further configured to blend each layer and add/adjust the colorant recipe for each pixel in a layer to a final colorant recipe for a pixel. The color management system can also be further configured to perform an opacity function on the colorant recipe.

The instruction/metadata file can further include a layer file identifier corresponding to a layer file. The layer file and the colorant recipe can be effective to cause the inkjet printer to apply a colorant combination specified by the colorant recipe at a location on the substrate specified by a pixel of the layer file. The instruction/metadata file can further include a substrate identifier.

Some implementations can include a color production method. The method can include determining a target color and corresponding optical information of the target color. The method can also include matching the optical information corresponding to the target color with predicted optical information of a colorant recipe, the predicted optical information of the colorant recipe being based on output device characterization information corresponding to a combination of an output device, an output device operational mode, a substrate, one or more colorants and one or more illuminants/sources and/or one or more observer vision characteristics. The method can further include communicating an instruction/metadata file containing the colorant recipe and optical information associated with the colorant recipe to the one or more output devices. The method can also include causing the output device to produce a colored article bearing a color generated according to the colorant recipe.

The method can further include blending each layer and adding/adjusting the colorant recipe for each pixel in a layer to a final colorant recipe for a pixel. Performing an opacity function on the colorant recipe.

The instruction/metadata file can further include a layer file identifier corresponding to a layer file. The layer file and the colorant recipe can be effective to cause the inkjet printer to apply a colorant combination specified by the colorant recipe at a location on the substrate specified by a pixel of the layer file. The instruction/metadata file can further include a substrate identifier.

In some implementations of the system or method, the output device can include an inkjet printer. In some implementations of the system or method, the output device can include an analog dyeing system. In some implementations of the system or method, the output device can include an analog printing system. In some implementations of the system or method, the output device can include an electrophotography system.

Some implementations can include a method. The method can include accessing one or more buildup curves associated with a combination of a substrate, one or more colorants and a colorant dispenser, the buildup curve specifying optical characteristics of one or more prints generated using the substrate, the one or more colorants and colorant dispenser combination. The method can also include accessing a design file specifying a design, the design file including one or more layer files, and extracting the one or more layer files from the design file, each layer file specifying a layer color. The method can further include generating, for each layer color, a corresponding colorization recipe based on the one or more buildup curves, and populating a design instruction/metadata file with the colorization recipe corresponding to each layer file and with a reference value corresponding to the one or more buildup curves. The method can also include creating a production job instruction/metadata file having a link to the design instruction/metadata file and including parameters associated with the print job to be carried out using the design instruction/metadata file, the production job instruction/metadata file, the design instruction/metadata file being operative to instruct a colorant dispenser to dispense colorant (e.g., to instruct a printer to print the design).

The method can further include transmitting the design instruction/metadata file and the production job instruction/metadata file to a colorant dispenser associated with the combination of the substrate, the one or more colorants and the colorant dispenser. The method can also include dispensing colorant (e.g., printing the design on a printer) using the design instruction/metadata file and the production job instruction/metadata file. The method can also include obtaining spectral information from an output article produced by a colorant dispenser (e.g., a print of the design printed by the printer), and adjusting one or more of the colorization recipes based on the spectral information.

The one or more buildup curves can be generated based on spectral information associated with the substrate, one or more colorants and colorant dispenser combination. The method can further include creating a display profile effective to render the design on a computer display device such that the colors of the design will appear on the display device substantially the same as the colors of the design will appear on an article bearing the design as applied by the colorant dispenser (e.g., as printed by the printer).

Some implementations can include a system comprising one or more processors configured to perform operations. The operations can include accessing one or more buildup curves associated with a combination of a substrate, one or more colorants and a colorant dispenser, the buildup curve specifying optical characteristics of one or more prints generated using the substrate, one or more colorants and colorant dispenser combination, and accessing a design file specifying a design, the design file including one or more layer files. The operations can also include extracting the one or more layer files from the design file, each layer file specifying a layer color, and generating, for each layer color, a corresponding colorization recipe based on the one or more buildup curves.

The operations can further include populating a design instruction/metadata file with the colorization recipe corresponding to each layer file and with a reference value corresponding to the one or more buildup curves, and creating a production job instruction/metadata file having a link to the design instruction/metadata file and including parameters associated with the production job to be carried out using the design instruction/metadata file, the production job instruction/metadata file, the design instruction/metadata file being operative to instruct a colorant dispenser to produce the design (e.g., to instruct a printer to print the design).

The operations can also include transmitting the design instruction/metadata file and the production job instruction/metadata file to a colorant dispenser associated with the combination of the substrate, the one or more colorants and the colorant dispenser, and producing the design by dispensing colorants (e.g., printing the design on the printer) using the design instruction/metadata file and the production job instruction/metadata file. The operations can further include obtaining spectral information from an output article produced by the colorant dispenser (e.g., a print of the design printed by the printer), and adjusting one or more of the colorization recipes based on the obtained spectral information.

The one or more buildup curves can be generated based on spectral information associated with the substrate, one or more colorants and colorant dispenser combination. The operations can also include creating a display profile effective to render the design on a computer display device such that the colors of the design will appear on the display device substantially the same as the colors of the design will appear on an article bearing the design as produced by a colorant dispenser (e.g., printed by a printer).

Some implementations can include a nontransitory computer readable medium having software instructions stored thereon that, when executed by one or more processors, cause the one or more processors to perform operations. The operations can include accessing one or more buildup curves associated with a combination of a substrate, an one or more colorants and a colorant dispenser, the buildup curve specifying optical characteristics of one or more prints generated using the substrate, one or more colorants and colorant dispenser combination, and accessing a design file specifying a design, the design file including one or more layer files. The operations can also include extracting the one or more layer files from the design file, each layer file specifying a layer color, and generating, for each layer color, a corresponding colorization recipe based on the one or more buildup curves.

The operations can further include populating a design instruction/metadata file with the colorization recipe corresponding to each layer file and with a reference value corresponding to the one or more buildup curves, and creating a production job instruction/metadata file having a link to the design instruction/metadata file and including parameters associated with the print job to be carried out using the design instruction/metadata file, the production job instruction/metadata file, the design instruction/metadata file being operative to instruct a colorant dispenser to dispense colorants according to the design (e.g., to instruct a printer to print the design).

The operations can also include transmitting the design instruction/metadata file and the production job instruction/metadata file to a colorant dispenser associated with the combination of the substrate, the one or more colorants and the colorant dispenser, and dispensing colorant (e.g., printing the design on the printer) using the design instruction/metadata file and the production job instruction/metadata file. The operations can further include obtaining spectral information from an output article produced by the colorant dispenser (e.g., an output print of the design printed by the printer), and adjusting one or more of the colorization recipes based on the obtained spectral information.

The one or more buildup curves can be generated based on spectral information associated with the substrate, one or more colorants and colorant dispenser combination. The operations can also include creating a display profile effective to render the design on a computer display device such that the colors of the design will appear on the display device substantially the same as the colors of the design will appear on an article produced by the colorant dispenser (e.g., on a printed article bearing the design printed by a printer).

Some implementations can include a system comprising a colorant build-up characterization module and a profile generation module. The system can also include a recipe color matching module, a colorant dispensing instruction module, a production queue module and a digital recipe conversion module. The system can also include a layer compression module.

The colorant build-up characterization module can be configured to perform a system build-up characterization function, and to maintain a history of primary colorant build-up data and associated substrates. The colorant build-up characterization module can be configured to utilize an illuminant/observer pair (or one or more illuminants/sources and/or one or more observer vision characteristics) and error metric selected for each primary colorant to produced proposed concentrations for each step in the characterization.

The system can be configured to predict a color mixture's recipe using colorants having nonlinear build-up measurements.

Some implementations can include a method comprising predicting a colorant recipe mixture for one of a spectrophotometer reflectance measurement and color space coordinates based on colorant build-up spectral measurements.

Some implementations can include a method comprising characterizing a colorant dispenser and determining one or more colorant recipes based on the colorant dispenser characterization. The method can also include adjusting the one or more colorant recipes to generate one or more adjusted colorant recipes, and selecting a set of one or more matching colorant recipes from among the one or more colorant recipes and the one or more adjusted colorant recipes. The method can further include providing one or more layers files and an instruction/metadata file, the one or more layer files containing location information and the instruction/metadata file containing the set of one or more matching colorant recipes, the one or more layer files and the instruction/metadata file effective to cause the colorant dispenser to dispense colorant according to the one or more matching colorant recipes at specified locations according to the one or more layer files Characterizing the colorant dispenser can include a) dispensing two or more colorant sections onto a substrate according to corresponding colorant concentrations, and b) measuring one or more optical characteristics of the two or more colorant sections. The method can also include c) computing an error based on the one or more optical characteristics of the two or more colorant sections, and d) determining whether the two or more colorant sections have a suitable progression including a colorimetric progression and a spectral progression.

The method can further include e) when the two or more colorant sections do not have a suitable progression, setting colorant concentrations to adjusted values and repeating a) through f), and f) when the two or more colorant sections have a suitable progression, constructing a colorant dispenser characterization table based on the colorant concentrations.

Determining one or more colorant recipes based on the colorant dispenser characterization can include a) constructing one or more candidate colorant combination sets, and b) selecting one of the candidate colorant combination sets. The method can also include c) selecting an initial colorant recipe, and d) incrementally adjusting concentrations of colorants in the initial colorant recipe. The method can further include e) providing an adjusted initial colorant recipe, and f) determining whether the adjusted recipe is within a tolerance.

The method can also include g) when the adjust recipe is within the tolerance, selecting the adjusted recipe as a mixture recipe, and h) when the adjusted recipe is not within the tolerance, determining whether the adjusted recipe is converging. The method can further include i) when the adjust recipe is not converging, repeating c)-j) to determine if an adjustment to an initial recipe will converge or repeating b)-j) to select a new combination for an initial recipe, and j) when the adjust recipe is converging, setting the adjusted recipe as the initial recipe and repeating d)-j).

Some implementations can include a system comprising one or more processors configured to perform operations. The operations can include characterizing a colorant dispenser, and determining one or more colorant recipes based on the colorant dispenser characterization. The operations can also include adjusting the one or more colorant recipes to generate one or more adjusted colorant recipes, and selecting a set of one or more matching colorant recipes from among the one or more colorant recipes and the one or more adjusted colorant recipes.

Characterizing the colorant dispenser can include a) dispensing two or more colorant sections (or blocks) onto a substrate according to corresponding colorant concentrations, and b) measuring one or more optical characteristics of the two or more colorant sections. The operations can also include c) computing an error based on the one or more optical characteristics of the two or more colorant sections, and d) determining whether the two or more colorant sections have a suitable progression including a colorimetric progression and a spectral progression. The operations can further include e) when the two or more colorant sections do not have a suitable progression, setting colorant concentrations to adjusted values and repeating a) through f), and f) when the two or more colorant sections have a suitable progression, constructing a colorant dispenser characterization table based on the colorant concentrations.

Determining one or more colorant recipes based on the colorant dispenser characterization can include a) constructing one or more candidate colorant combination sets, and b) selecting one of the candidate colorant combination sets. The operations can also include c) selecting an initial colorant recipe, and d) incrementally adjusting concentrations of colorants in the initial colorant recipe. The operations can further include e) providing an adjusted initial colorant recipe, and f) determining whether the adjusted recipe is within a tolerance. The operations can also include g) when the adjust recipe is within the tolerance, selecting the adjusted recipe as a mixture recipe, and h) when the adjusted recipe is not within the tolerance, determining whether the adjusted recipe is converging. The operations can also include i) when the adjust recipe is not converging, repeating c)-j) to determine if an adjustment to an initial recipe will converge or repeating b)-j) to select a new combination for an initial recipe, and j) when the adjust recipe is converging, setting the adjusted recipe as the initial recipe and repeating d)-j).

Some implementations can include a nontransitory computer readable medium having stored thereon instructions that, when executed by one or more processors, cause the processors to perform operations. The operations can include one or more of the operations mentioned above with regarding to the system implementation.

Some implementations can include a method comprising transmitting colorant dispensing data to a colorant dispenser. The colorant dispensing data can include one or more layer files each specifying a color of one or more pixels, and one or more colorant recipes, each colorant recipe corresponding to a layer file. Each layer file and corresponding colorant recipe can be configured to be effective to cause the colorant dispenser to dispense colorant onto a substrate at a location specified by each of the one or more pixels of each corresponding layer file.

Some implementations can include a system comprising one or more processors configured to perform operations. The operations can include transmitting colorant dispensing data to a colorant dispenser. The colorant dispensing data can include one or more layer files each specifying a color of one or more pixels, and one or more colorant recipes, each colorant recipe corresponding to a layer file. Each layer file and corresponding colorant recipe can be configured to be effective to cause the colorant dispenser to dispense colorant onto a substrate at a location specified by each of the one or more pixels of each corresponding layer file.

Some implementations can include a nontransitory computer readable medium having stored thereon instructions that, when executed by one or more processors, cause the processors to perform operations. The operations can include transmitting colorant dispensing data to a colorant dispenser. The colorant dispensing data including one or more layer files each specifying a color of one or more pixels, and one or more colorant recipes, each colorant recipe corresponding to a layer file. Each layer file and corresponding colorant recipe can be configured to be effective to cause the colorant dispenser to dispense colorant onto a substrate at a location specified by each of the one or more pixels of each corresponding layer file.

Some implementations can include a method comprising producing an article having a substrate including one or more colorants applied with a digital colorant dispenser controlled according to one or more layer files having one or more corresponding pixels and instruction data having one or more colorant recipes each corresponding to a layer file, each layer file and each corresponding colorant recipe configured to be effective to cause the digital colorant dispenser to dispense colorant onto the substrate at a location specified by each pixel of each corresponding layer file.

Some implementations can include a system comprising a digital colorant dispenser configured to produce an article having a substrate with one or more colorants applied thereto, the digital colorant dispenser being controlled according to one or more layer files having one or more corresponding pixels and instruction data having one or more colorant recipes each corresponding to a layer file, each layer file and each corresponding colorant recipe configured to be effective to cause the digital colorant dispenser to dispense colorant onto the substrate at a location specified by each pixel of each corresponding layer file.

Some implementations can include a method of matching two or more colorant dispensers. The method can include a) associating each of one or more second colorants on a second colorant dispenser with a corresponding first colorant on a first colorant dispenser, and b) proposing, for each color block of one or more color blocks, colorant concentrations on the second dispenser predicted to result in similar color space coordinates as color space coordinates associated with each color block produced by the first dispenser.

The method can also include c) dispensing the one or more color blocks on the second dispenser, each color block corresponding to a corresponding first colorant, and d) measuring each color block with a spectrophotometer to obtain spectrophotometer readings.

The method can further include e) computing color space coordinates for each color block produced by the second dispenser based on the spectrophotometer readings, and f) determining an error between each of the color space coordinates of the color blocks dispensed by the second dispenser and corresponding color space coordinates associated with each color block produced by the first dispenser. The method can also include g) determining an adjustment to the colorant concentrations for the second dispenser to minimize errors based on color matching using the spectrophotometer readings, and h) repeating c)-g) until the color space coordinates of the color blocks dispensed by the second dispenser and corresponding color space coordinates associated with each color block produced by the first dispenser are within a given value.

The method can further include i) generating a correction table configured to map color concentrations of the first colorant dispenser to concentrations for the second colorant dispenser to produce equivalent color space values of the one or more color blocks.

In some implementations, the color space can include CIE L*a*b. In some implementations, concentrations for the colorant on the second dispenser can be initialized to concentrations used for the colorant on the first dispenser.

The method can further include assigning color values in CIE L*a*b color space to each color block successively to generate an initial set of color space coordinates, wherein the initial set of CIE L*a*b coordinates is set as a target for the color block steps produced by the second dispenser.

Some implementations can include a method. The method can include transmitting colorant dispensing data to a first colorant dispenser, the colorant dispensing data including one or more layer files having one or more corresponding pixels and instruction data having one or more colorant recipes each corresponding to a layer file, each layer file and each corresponding colorant recipe configured to be effective to cause the first colorant dispenser to dispense colorant onto a substrate at a location specified by each of the one or more pixels of each corresponding layer file. The method can also include transmitting colorant dispensing data and a correction table to a second colorant dispenser, different from the first colorant dispenser, the colorant dispensing data and the correction table effective to cause the second colorant dispenser to produce output substantially similar to output of the first color dispenser.

BRIEF DESCRIPTION OF THE DRAWINGS

FIG. 5 is a diagram of an example colorant build-up table in accordance with some implementations.

DETAILED DESCRIPTION

Figure 1:
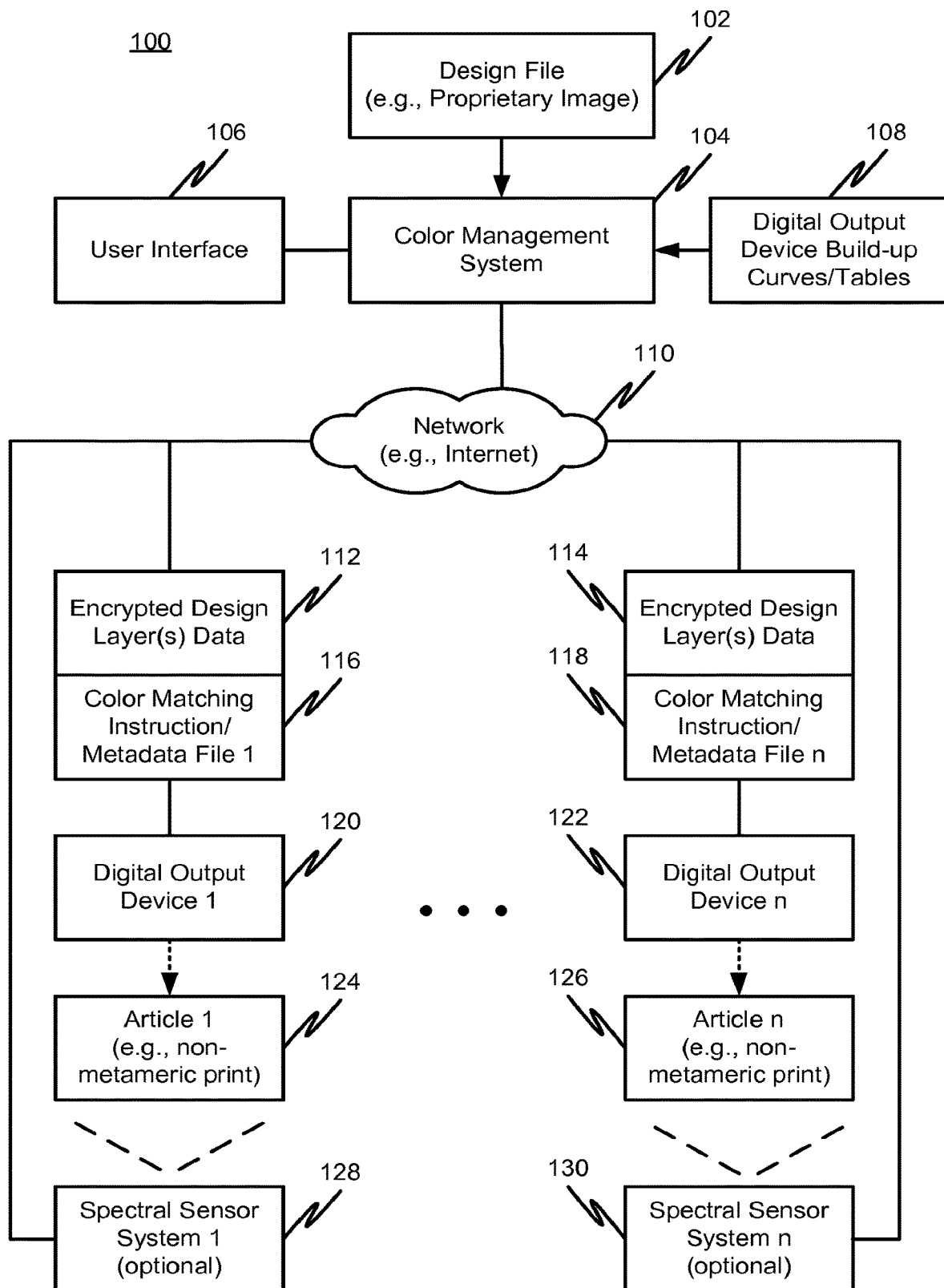
FIG. 1 is a diagram showing an example color management environment in accordance with some implementations.

In general, some implementations can include a collection of integrated software applications effective for precise management of color in both a design coloration aspect and a final product colorant dispensing aspect whether in a digital workflow or a conventional workflow environment. Some implementations can provide efficient and accurate color management via the Internet within color related areas of industries including piece dyeing, textiles, coatings, plastics, papers, foods and drugs.

Some implementations can include a set of integrated applications constructed and arranged to provide precise management of color. Some implementations can provide a level of color communication and color accuracy capability to meet demands of a particular industry (e.g., the textile industry). Some implementations can also provide a capability of utilizing digital technology to produce samples and short run colorant dispensing production jobs that can be matched to the conventional process. In this manner, some implementations can provide the capability to "bridge" these two different mechanisms—the digital and conventional—of colorant dispensing to allow a user to effectively choose the most profitable means of production.

In some implementations, each of the integrated applications can be used as independent applications in a traditional digital/conventional work environment. However, when used as an "application suite," the integrated applications may offer an ability to improve delivery logistics of the traditional market by enabling instant communication of color and other specific customer job requirements. This can reduce errors, time delays, inaccuracies, and lost business that some supply chains (e.g., textile printing) may incur from design to final product.

Some implementations can provide accurate color matching and representation. For example, recipe color matching can include color capability and accuracy beyond that found in some conventional decorative digital print systems. The recipe color matching can provide efficient and highly accurate creation and global communication of color for use in any industry where colorants may be applied (e.g., decorative printing using layered designs). Further, the color matching described herein can manage color to accuracy levels that may be difficult to achieve in an ICC color managed workflow. A properly managed ICC color workflow may include a specification that as long as 80% of the colors produced are within a delta E (DE), e.g., according to the CMC(1:c) Colour Difference Formula, tolerance of 3-6 DE with not more than 3% exceeding a 12 DE, the process is within tolerance. The textile industry typically demands a color accuracy of 1.5 DE or less with some products needing a DE of less than 0.5 DE. The high level of color accuracy and formulation possibilities within the textile industry have traditionally been possible in conventional textile printing processes (i.e., non-digital dye processes) because of the use of color recipe prediction algorithms in the dye-based processes.

Some implementations can be configured to control a colorant dispenser (e.g., a digital textile printer) as an accurate dispensing system. The colorant dispenser becomes a recipe driven device. Because of this segregation of color away from the image, some implementations are able to dispense any liquid that is capable of being dispensed by the output device with accuracy in terms of amount of liquid dispensed and location on the substrate where liquid is dispensed.

In addition, color matching applications described herein can provide a "one click correct" capability for the management and creation of color. This feature can include using a spectrophotometer measurement (e.g., reflectance) to create a precise color. After a sample patch of the color is produced (e.g., colorant is dispensed onto a substrate by a colorant dispenser), a patch of the color may be measured and the application can automatically make an adjustment to the recipe of the color if the measured patch is not within specified tolerances. In this manner, the application can automatically correct for variables or drift within a colorant dispensing system.

It is not unusual for the textile industry to require color matching to be done under different illuminants simultaneously. This is to allow a sample to meet the color matching requirements to a standard as it is moved through supply chain and retail environments. This type of color matching is called non-metameric color matching. A capability for non-metameric color matching may be difficult or impossible in an ICC color managed workflow because the focus is on D50 and CIE 2 degree Standard Observer.

Some implementations can include a capability of creating non-metameric color matches. A full capability of colorant (e.g., ink, dye or the like) control can be provided for formulating a color match. A full range of color matching criteria and accuracy may be available and may be limited only by the colorants in the production environment. Colorants used in the color matching process can be specified along with what illuminant(s) the sample should be matched under and the metrics around the color match, ranging from color accuracy to physical properties of the colorants or the match desired. Some or all of the industry standard illuminants for matching can be presented as well as the tolerance level of the desired match.

Some implementations provide for the various levels of color management to have visibility to the capability of the manufacturing process. For example, a true representation of the final product displayed. Also, a system may prevent visualization or creation of a product that cannot be reproduced by the manufacturing process based on a color gamut limit feature. Some implementations can also provide objective color control.

In addition, a color can be selected from a dynamically generated palette that is created from the colorants defined by a chosen profile. Such a palette can permit access to any color within the gamut of available colorants, while preventing selection of colors outside the capability of the colorants. In this manner, some implementations can prevent creating or viewing an output that the manufacturing process (e.g., substrate pre-processing, colorant dispensing, and produced article post processing) is not capable of producing. Through the use of formulation technology, some implementations are able to increase the color gamut of the available colorants while reducing the average colorant consumption by about 55-75% over an ICC color managed workflow.

A profile generation module can create an RGB profile representative of the color space of the output device. The profile generation module can perform this by utilizing formulation algorithms to calculate the capability of the colorants and their combinations using the data captured by the colorant build-up characterization module during the colorant dispensing system characterization process. By creating this colorant dispenser gamut representative profile that can be provided in an RGB monitor format, an image file can be created and/or edited while providing on screen an accurate representation of the final product in terms of color. This capability can also help prevent creation of colors that are outside the capability of the colorant dispenser and also can present accurate numerical color values of the capability of the colorant dispenser.

Some implementations can also provide an ability to match digitally and conventionally produced products (e.g., to match printed and dyed products). Some implementations can be configured to maximize the capability of high speed digital print machines and to create a seamless bridge between conventional and digital print production. Some implementations can provide a digital supply chain from design colorization to final printed product whether in a digital or conventional process.

In various implementations, colors created and managed within the recipe color matching described herein are managed as recipes. The recipe color matching can include an ability to create color(s) in a digital colorant dispensing process that can mimic the colors used in some conventional printing processes. This allows the output from recipe color matching to be able to match a conventionally created product. In some implementations, the recipe color matching can include a color recipe driven system at the pixel level, and can mimic a conventional process from which data has been gathered. That is, each layer file of a recipe color matching design image may represent a cylinder/rotary screen in a conventional print operation. For the conventional process, each cell size for each gravure/screen may represent a tone in the layer file and vice versa for the digital process. Recipe color matching may be able to predict and simulate the color build up and mixing of gravure and wet print processes in a digital production environment.

Furthermore, recipe color matching may be able to simulate different engraving mechanisms through look up tables and to also manage the gamma corrections or changes to gray scale layers. Recipe color matching can optionally shift each layer independently to simulate a trapping appearance of the conventional print operation. This can give flexibility to duplicate a conventional process or to go beyond limitations of some conventional processes to realize additional creative capabilities of the application.

When used in the color management workflow described herein, the output of the recipe color matching module system can be a small (e.g., <2 Kb) instruction/metadata file that can be directly opened by production system (e.g., a print instruction or print queue module or page layout program for the printer). The information required to produce a final product at a remote print facility utilizing the color management system can be encapsulated within this small instruction/metadata file.

The information to permit a remote user to view and print the correct output is included in the instruction/metadata file. The information for illuminants and final color accuracy are included as well in the instruction/metadata file. The instruction/metadata file can permit a remote printer to create the exact color without requiring the movement of any physical samples. The print instruction module is capable of utilizing the small (e.g., <2 Kb) instruction/metadata files output by the recipe color matching module to create on screen a visual representation of the final output the colorant dispenser (e.g., digital print machine) will produce. The print instruction module can be utilized as preparation for the final digital output and can save these layouts for future printing by a production queue module. Not only is the print instruction module capable of utilizing these small instruction/metadata files, but the print instruction module is also capable of working simultaneously within the confines of a traditional ICC color managed workflow. Some implementations can provide a user a capability to print both recipe generated images generated by the recipe color matching module as well as traditional ICC color managed true color images. The print instruction module is capable of mixing both types of images and data files, and also to manage the correct output without any additional instructions from the user.

The print instruction module is also another mechanism designed to protect the IP of the design information. By managing the output through these small instruction/metadata files, there may not be any true color files created for access by third party graphic systems. There may not be an output file created when used in the color management workflow if driving a printer that allows direct communication by the raster image processor (RIP). A secondary, though valuable benefit of this small instruction/metadata file is the efficiency of data traffic within the workflow as large true color files are never created. This can reduce both internet and intranet traffic as small instruction/metadata files (e.g., <2 Kb) can be transmitted and processed as opposed to large true color files that can easily reach 1 GB or greater.

Another feature of the dynamic creation of print machine data from the instruction/metadata files is that a user may not be restricted by files with extremely large vertical repeats such as when a file is rotated at a small odd angle during production. Effectively, there may be no vertical repeat restriction; the application will continue to "build" the image until the length of the print specified by the user (e.g., via a print instruction/metadata file) is reached. For example, if an image has a length of twelve inches, but the user has specified a print length of 100 feet, the application can repeat the printing of the image 100 times on the substrate (e.g., fabric fed from a roll). This vertical repeat flexibility may be difficult or not possible with conventional systems on the market today.

Some implementations can also provide for accurate and/or "premium quality" dithering methods. Some implementations can include dithering methods that are highly specialized in maximizing the use of "variable drop" and "multi drop" capabilities if a particular colorant dispenser (e.g., printer) supports them. This can increase the inherent resolution of the output, allow a higher resolution to be used to reduce production time, help reduce the need for light versions of the primary colors, and help increase the detail duplication of the original data. It may also increase the apparent quality of tonal images and computer generated vignettes. Some implementations provide a number (e.g., 8) of different dithering methods that are user selectable as well as different implementations of these dithers. In this manner, the user is able to choose a quality efficient dither for the images to produce. Each of these dithers is selectable at an image level so that the user is not restricted to a single dither even if multiple images are being produced. Some implementations can also have the capability of allowing the user to add "noise" to the output data that is created for delivery to the colorant dispenser. This can enhance the quality of tonal vignettes that are generated by a digital CAD system. It can help reduce or eliminate the problem of density shifts that are commonly seen with reproducing data of this type with other RIPS. The user has full control over the amount of "noise" that is added to the image as well as the percentage of the image that is modified. This gives the user control over the final quality of the printed image depending on the image type. This process can be transparent to the user and can be performed dynamically at production time.

Some implementations can provide file compression and encryption. For example, the layer compression module can provide file compression and encryption methods that are configured to take each layer of the design file for data extraction, compression, and encryption, and can reduce or minimize the compressed file size for data communication, improve or maximize speed of loading of the file for a variety of applications, improve or maximize the security of the encrypted file for IP protection, and provide a lossless (or near lossless) data compression algorithm that allows the original data to be accurately reconstructed from the compressed data.

In carrying out file compression, an implementation can first examine the characteristics of the file to be compressed, such as one or more tonal design properties, one or more flat design properties, horizontal differences between the tonal pixels, number of tones, a mathematical pattern of the pixels, and/or repeat data and scan lines or tiles.

Some implementations first establish multiple file compression methods. More than one file compression method can be selected to compress a given file in a sequential chain of events manner based on the file characteristics. Thus, each given file is subject to data compression in a sequential manner by more than one method until a reduced or smallest file size is achieved. Once this file compression operation is completed, the compressed file may be encrypted. The encrypted file can carry two different files—a high resolution file for detail work such as for printing and a low resolution file such as for digital display purpose.

Some examples of file compression methods include: tonal level compression method, scan line repeat, scan line repeat with offset, image composition, and/or image composition with offset. Some implementations select any of these suitable compression methods to be applied in a sequential manner.

FIG. 1 shows a diagram of a color management environment 100. The environment 100 includes a design file 102, a color management system 104, a user interface 106, one or more build-up tables/curves 108, a network 110, one or more encrypted design layer files (112, 114), one or more instruction/metadata files (116, 118), one or more digital output devices (120, 122), one or more produced articles (124, 126), one or more spectral sensor systems (128, 130).

In operation, the design file 102 is received (or retrieved) by the color management system 104. The color management system 104 performs a color matching process on the design file 102 using colorization build-up tables 108. The color matching process is described in greater detail below with respect to FIGS. 2 and 3.

A result of the color matching process is one or more instruction/metadata files (116, 118). The instruction/metadata files (116, 118) are sent to one or more corresponding digital output devices (120, 122) along with one or more corresponding design layer files (112, 114), which can be optionally encrypted. The design layer files (112, 114) and the instruction/metadata files (116, 118) are used by the corresponding digital output devices (120, 122) to produce articles (124, 126).

The produced articles (124, 126) can be scanned by a spectral sensor system (128, 130; e.g., a spectrophotometer) in order to acquire spectral information about the colors of the produced articles (124, 126). The spectral information can then be provided to the color management system 104 to permit the color management system to optionally adjust color matching recipes based on the spectral information.

The network 110 can include one or more of a local area network (LAN), a wide area network (WAN), a wireless network, the Internet or the like. The user interface 106 can be provided via a system such as a desktop computer, laptop computer, tablet computing device, wireless device or the like. The produced article (124, 126) can include printed fabric.

Figure 2:
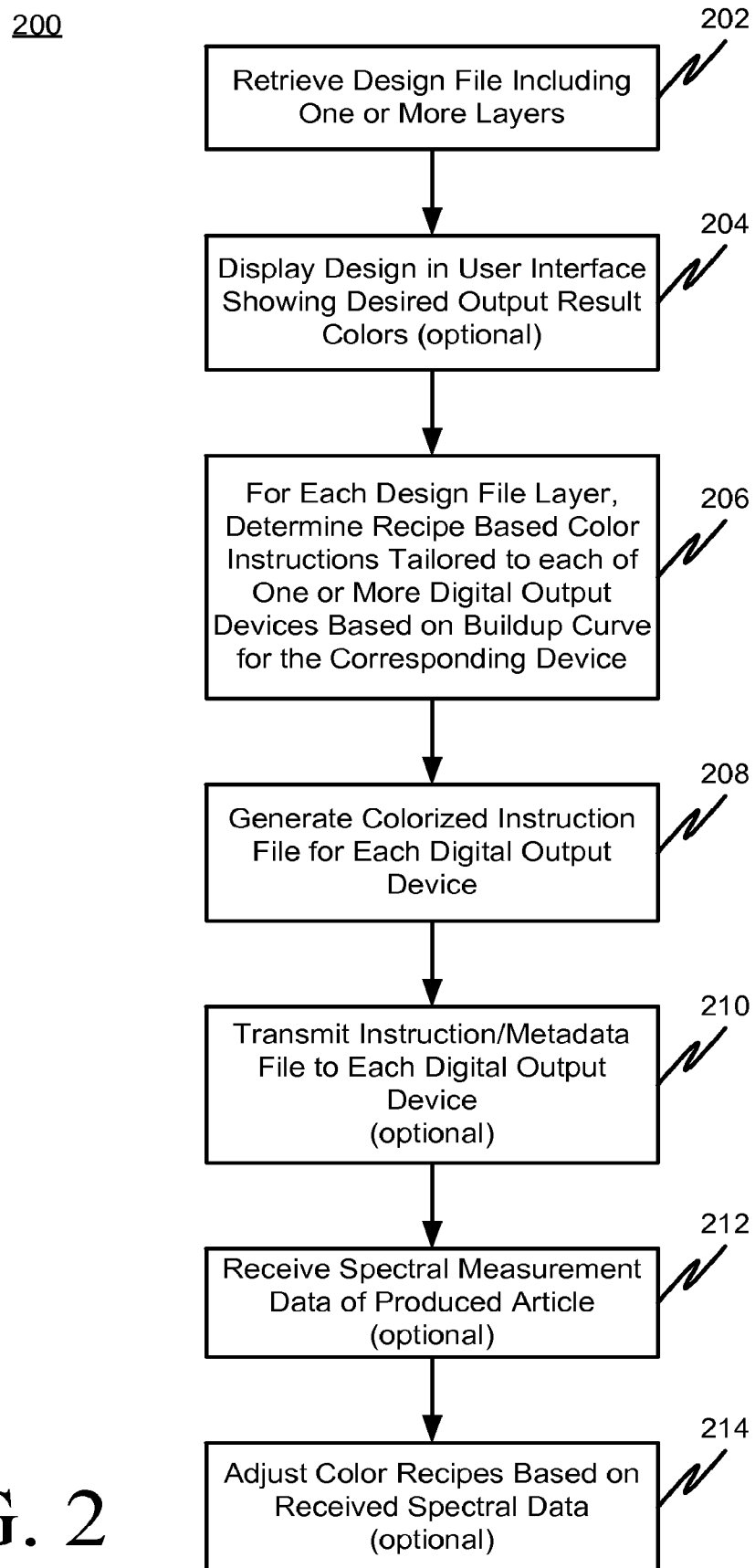
FIG. 2 is a chart of an example color management method in accordance with some implementations.

FIG. 2 is a chart of an example color management method 200 in accordance with some implementations. Processing begins at 202, where a design file is retrieved or received. The design file specifies a design and can include one or more layer files each corresponding to one or more colors. For example, a design file 102 can be received by a color management system 104. Processing continues to 204.

At 204, the design can optionally be displayed in a user interface (e.g., 106) on a display device showing the desired output result. For example, the design can be displayed using a conventional ICC profile generated for displays (or for true color images). The conventional ICC profile can be generated by a profile generation module, such as 404 described below. Processing continues to 206.

At 206, recipe colorization instructions are determined for each design file layer color. The recipe colorization can be generated using colorant characterization build-up tables for a corresponding combination of an output device (e.g., digital fabric printer), output device operational mode or parameters, one or more colorants, a substrate and an illumination. Processing continues to 208.

At 208, a colorized instruction/metadata file (e.g., 600 described below) is generated for the design using the recipe colorization instructions. Processing continues to 210.

At 210, a colorized instruction/metadata file is optionally transmitted to each digital output device (e.g., 120, 122). For example an instruction/metadata file can be sent from a color management system (e.g., 104) to an output device (e.g., 120, 122) via a network such as the Internet. The digital output devices can include digital textile printers such as those manufactured by Mimaki (e.g., TX500-1800DS), Reggiani Machine (e.g., ReNoir), MS (e.g., Lario), and SPGPrints (e.g., PiKE). Processing continues to 212.

At 212, spectral measurement data is optionally received. For example, a color management system 104 can receive spectral information from a spectral sensor (e.g., 128, 130). In some implementations, the spectral information can include measured reflectance data. Examples of spectral sensors include spectrophotometers such as those manufactured by X-rite (e.g., Ci6x Portable Spectrophotometer), BYK (e.g., Color-View Spectrophotometer), Konica Minolta (e.g., CM-2500c Spectrophotometer), and Data-Color (e.g., Datacolor 650 spectrophotometer). Processing continues to 214.

At 214, colorization recipes can be optionally adjusted based on the received spectral data. It will be appreciated that one or more of 202-214 can be repeated in whole or in part in order to accomplish a contemplated color management task.

Figure 3:
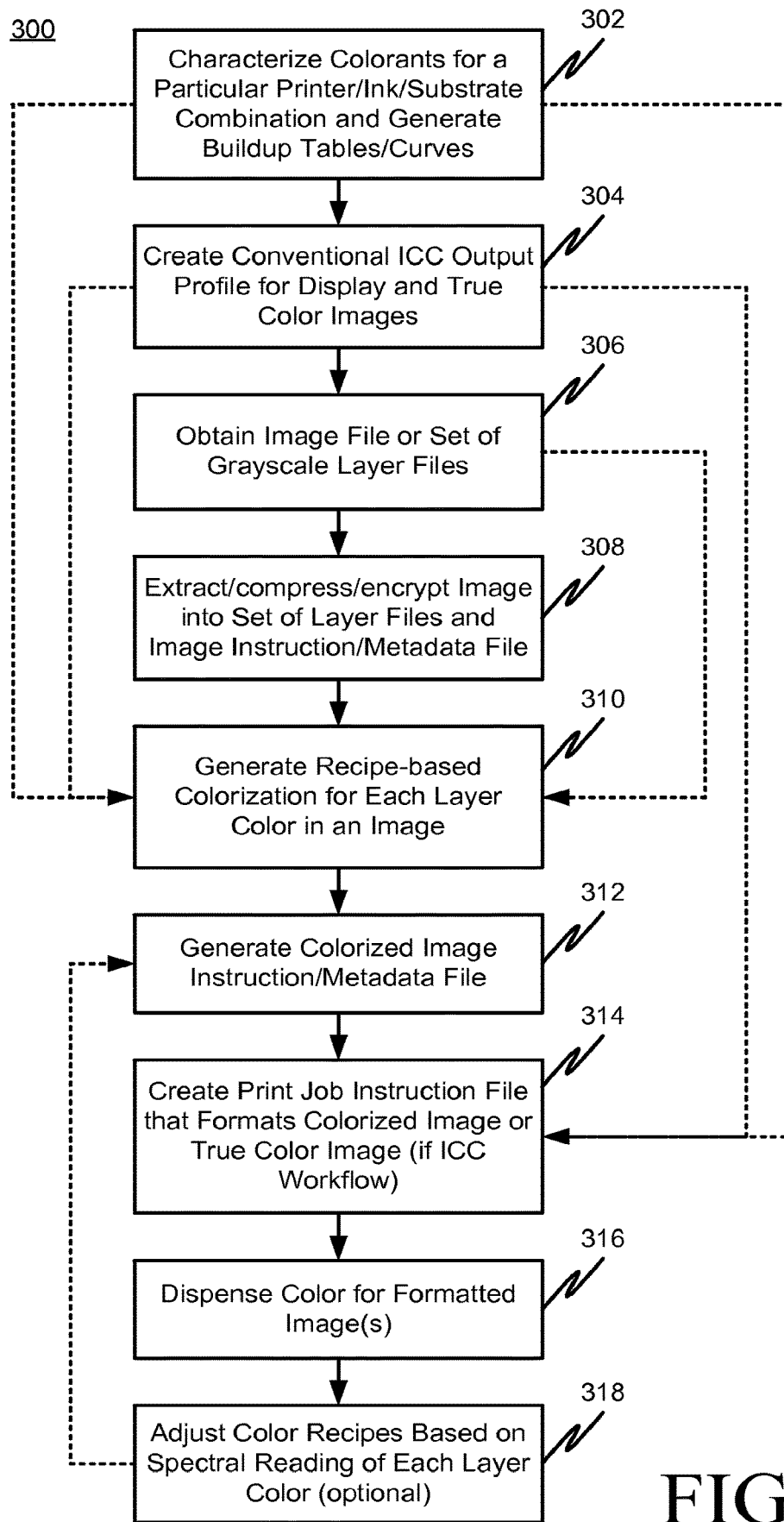
FIG. 3 is a chart of an example color management method in accordance with some implementations.

FIG. 3 is a chart of an example color management method 300 in accordance with some implementations. Processing begins at 302, where build-up tables/curves characterizing colorants are generated for one or more particular colorant dispensers, colorants and substrate and luminance combinations. The combinations can also include printer settings and/or finishing techniques. The build-up table is described in greater detail below in connection with FIG. 5. Processing continues to 304.

At 304, a conventional ICC output profile is generated from the build-up table(s). The ICC profile can be used, for example, for display and/or true color processes. Processing continues to 306.

At 306, an image file (or set of grayscale layer files) is obtained (e.g., received from another system, retrieved from a storage device, input via a user interface or the like). Processing continues to 308.

At 308, a set of layer files is extracted (if needed) from the image file and optionally compressed and encrypted. Also, an instruction/metadata file (e.g., 600 described below) is created. Processing continues to 310.

At 310, a recipe based colorization is generated for each layer color in an image. The recipe based colorization is generated using the build-up tables and specified reflectance data of an output color. Form these two sets of information, a recipe is generated based on a prediction of how a particular combination of a colorant dispenser, one or more colorants and a substrate will yield a produced article. Processing continues to 312.

At 312, a colorized image instruction/metadata file (e.g., 600) is generated. For example, the colorization information generated at 310 may be used to populate the instruction/metadata file created at 308. Processing continues to 314.

At 314, a production job instruction/metadata file (e.g., formatting and printing information for an image instruction/metadata file) is generated. The production job instruction/metadata file can reference one or more image (or design) instruction/metadata files. Processing continues to 316.

At 316, one or more articles are produced using colorant dispensing. Processing continues to 318.

At 318, the colorization recipes can be optionally adjusted based on a spectral reading of each layer color. It will be appreciated that 302-318 can be repeated in whole or in part.

Figure 4:
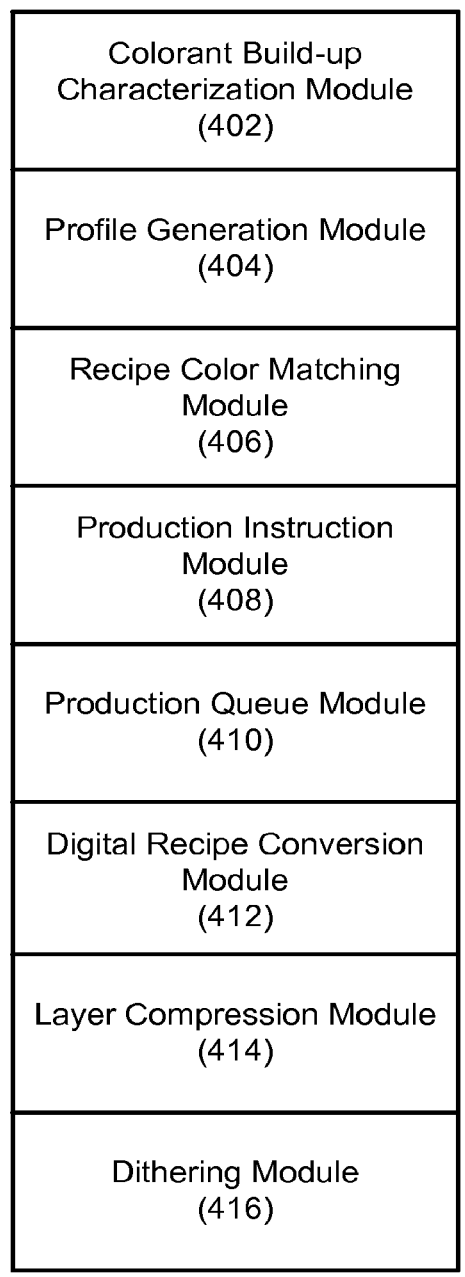
FIG. 4 is a diagram showing an example color management system in accordance with some implementations.

FIG. 4 is a diagram showing detail an example color management system 104 in accordance with some implementations. Color management system 104 can include a colorant build-up characterization module 402, a profile generation module 404, a recipe color matching module 406, a production instruction module 408, a production queue module 410, a digital recipe conversion module 412, a layer compression module 414 and a dithering module 416.

Figure 5:
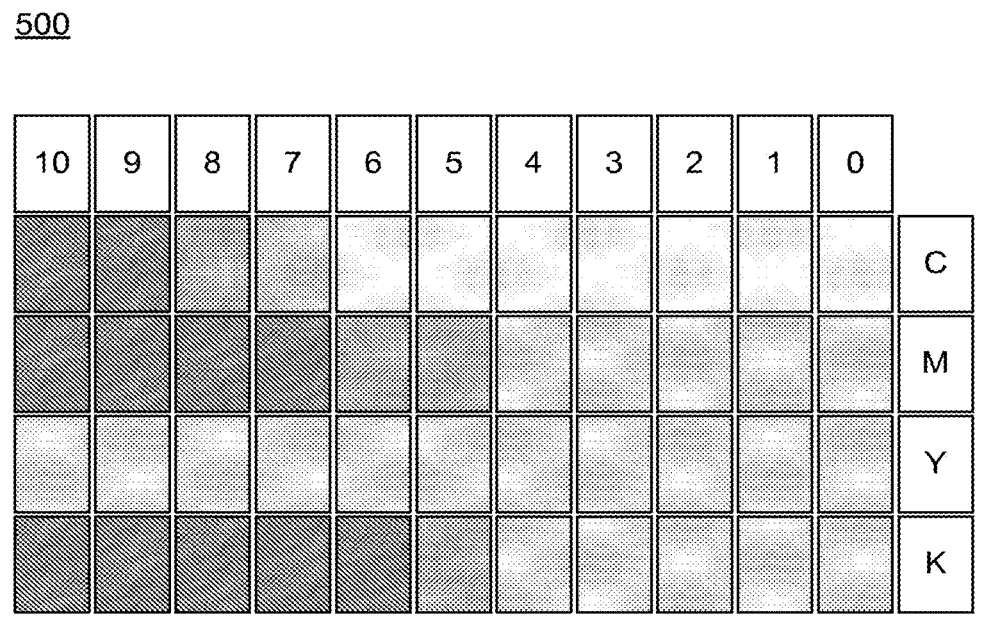

The build-up characterization module 402 can process a build-up output (see, e.g., FIG. 5 and description below). The build-up characterization module 402 is responsible for implementing the system build-up characterization function described above. The build-up characterization module 402 maintains a history (e.g., within a small file) of primary colorant build-up data and associated substrate. The build-up characterization module 402 implements both the normal build-up characterization of primary colorants, as well as, the targeted system characterization of primary colorants. The build-up characterization module 402 utilizes a specified illuminant/observer pair and error metric selected for each primary colorant to produce proposed concentrations for each step in the system characterization or, in the case of targeting, to determine how well the proposed concentration matches the target step.

In some implementations, a color matching process may begin with a system build-up characterization of the colorants on substrate for a set of colorants, a substrate and its pretreatment, a particular colorant dispenser and its operation mode (e.g., a printer and its print mode), as well as any post-treatment of the produced article (e.g., printed fabric). Build-up characterization of a colorant can include dispensing a set of color blocks where each successive color block is a known increase in the concentration of the colorant. FIG. 5 shows an example of the color blocks with increasing colorant concentration from block #0 to block #10 for each of the cyan, magenta, yellow and black colorant primaries for use with the system build-up characterization operation. In the example shown in FIG. 5, Block #0 is the un-colored textile substrate.

Once dispensed, the color blocks can be measured with a spectrophotometer for spectral reflectance factors and a build-up table relating concentration to measurement may be created for each colorant in terms of scattering coefficients and absorption coefficients for use with colorant recipe calculation. If the measurements do not produce a visually linear gradation of the colorants, adjustments are made to the color concentrations and the print/measurement cycle repeated until an acceptable gradation is obtained. The purpose of this process is to obtain, for each primary colorant, a concentration to measurement build-up table.

Before performing a system colorant build-up characterization, certain system build-up characterization parameters may be set (manually or automatically) for a colorant. These parameters can include, but are not limited to, the number of steps in the build-up characterization, the index for the physical ink slot in the digital printer being characterized, and the error metric used to measure differences between steps.

The profile generation module 404 is configured to create a valid ICC v4 profile using the specified colorant build-up data creating from the colorant build-up characterization module 402. It also imbeds this build-up data as a private tag within the created profile. For the A to B table, the profile generation module 404 can use concentration values of each primary colorant build-up data to predict the ICC PCS L*a*b values for each gridpoint within the table. For the B to A table, the profile generation module 404 can again use concentration values of each colorants build-up to predict the device coordinates necessary to produce the ICC PCS L*a*b gridpoint color. Unlike conventional profile creation programs, the profile generation module 404 may not rely on printed target charts. Gridpoints can be computed using system build-up characterization data created by the colorant build-up characterization module 402.

The recipe color matching module 406 performs the recipe-based color matching process described herein. The print instruction module 408 prepares the color matched instruction/metadata file and other image files into a dispensable file format. The production queue module 410 is configured to submit files to a colorant dispenser (e.g., printable file format files to a printer for printing) and to record all the relevant dispensing operation information into a log file. The digital recipe conversion module 412 is configured to convert digital recipes into the corresponding conventional recipes. The layer compression module 414 is configured to process each layer of the design file for data extraction, compression, and encryption.

Unlike some conventional press printing processes where the colorants are mixed in solution, in digital printing, colorants may be printed (or dispensed) in patterns of dots which the human eye will perceive as a particular color. The color management system described herein can include a hybrid error diffusion dither to print these patterns. Error diffusion is a type of halftoning in which the quantization residual is distributed to neighboring pixels that have not yet been processed. Typically, it is used to convert a multi-level image into a binary (black and white) image (for each color plane representing a printed versus a non-printed pixel).

Some implementations of the dithering module 416 are configured to use the number of variable sized dots the digital printer is capable of producing to convert the multi-level image into a set of multi-level grayscale images, where is grayscale level represents a variable-sized dot in the printed output. So, instead of a dot position being ON or OFF (as in the binary version), a dot at that particular position can be LARGE, MEDIUM, SMALL, or OFF (for a printer with a four variable dot sizes). In some implementations, the image to be printed is separated into grayscale ink planes. The level of a particular pixel within a grayscale ink plane is determined by the concentration of the associated colorant in the pixel's color recipe.

Figure 6:
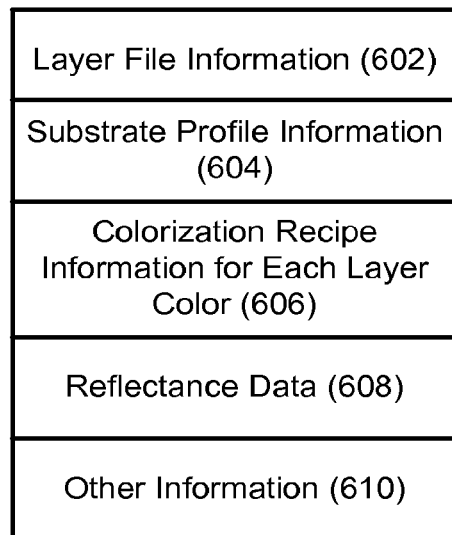
FIG. 6 is a diagram showing an example design instruction/metadata file in accordance with some implementations.

FIG. 6 is a diagram showing an example design instruction/metadata file 600 in accordance with some implementations. The design instruction/metadata file (or simply "instruction/metadata file") 600 includes layer file information 602, substrate profile information 604, colorization recipe information 606, reflectance data 608 and other information 610.

The layer file information 602 can include the layer file or files directly, or can include a reference value or identifier value that indicates a layer file or files stored elsewhere. The substrate profile information 604 can include one or more build-up tables (or curves) described herein. The colorization recipe information 606 can include a recipe (e.g., percentages of each available printer ink color, such as CMYK) providing a color formulation for each layer color. The reflectance data 608 can include specified reflectance data for each color layer for a given illumination (e.g., spectral reflectance factors from 380 nm to 730 nm at 10 nm intervals or 400 nm to 700 nm at 10 nm intervals in binary format). The other information 610 can include dimensions, engraving/tonal information, drops/flies, layer shifting information or the like.

In general, an instruction/metadata file can include information related to color matching for each design layer. For example, an instruction/metadata file can include illuminant and observer pair data or more than one set of such data if the user selected multiple illuminants, spectral reflectance data, and colorant recipe data. At the user interface, the user can select the color matching options including the illuminant.

Figure 7:
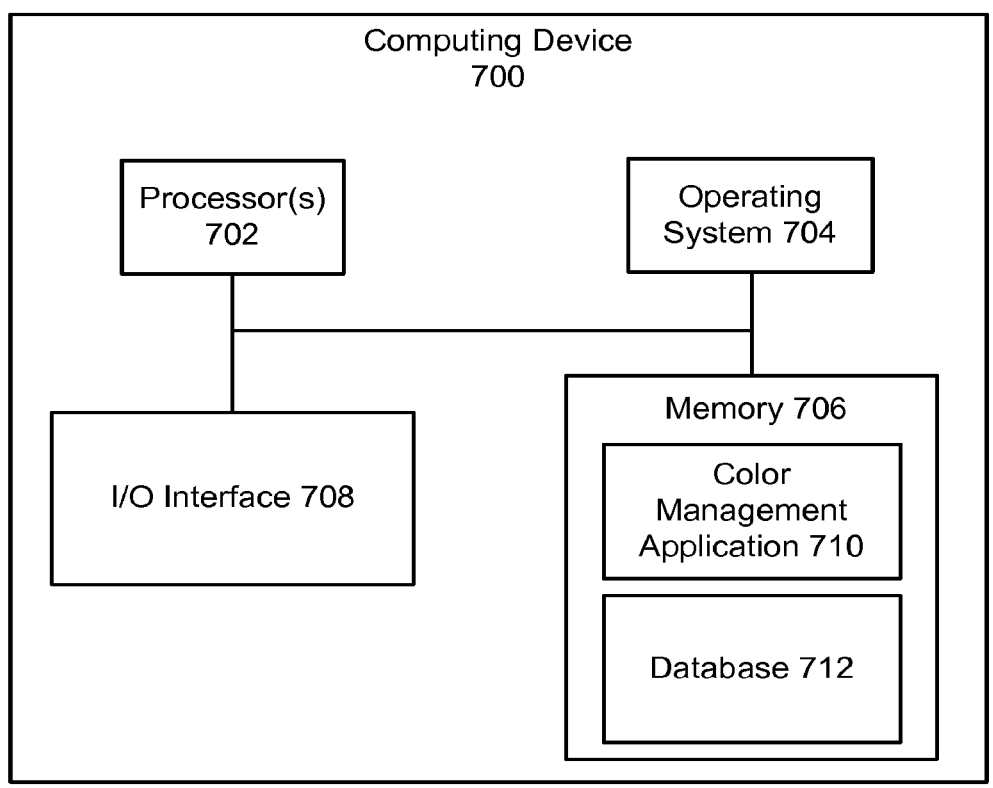
FIG. 7 is a diagram of an example computing device in accordance with some implementations.

FIG. 7 is a diagram of an example computing device 700 that can be used for color management in accordance with some implementations. The computer 700 includes one or more processors 702, an operating system 704, a memory 706 and an I/O interface 708. The memory 706 can include a color management application 710 (e.g., similar to that associated with 104 described above) and a database 712.

In operation, the processor 702 may execute the color management application 710 stored in the memory 706. The color management application 710 can include software instructions that, when executed by the processor, cause the processor to perform operations for color management and colorant dispensing workflow (e.g., the color management application 710 can cause one or more processors at the same or distributed systems to perform one or more of steps 202-214 and/or 302-318 described above and, in conjunction, can access the database 712). The color management application 710 can also operate in conjunction with the operating system 704.

A color management system (e.g., 104, 700 or the like) can include, but is not limited to, a single processor system, a multi-processor system (co-located or distributed), a cloud computing system, or a combination of the above.

Figure 8:
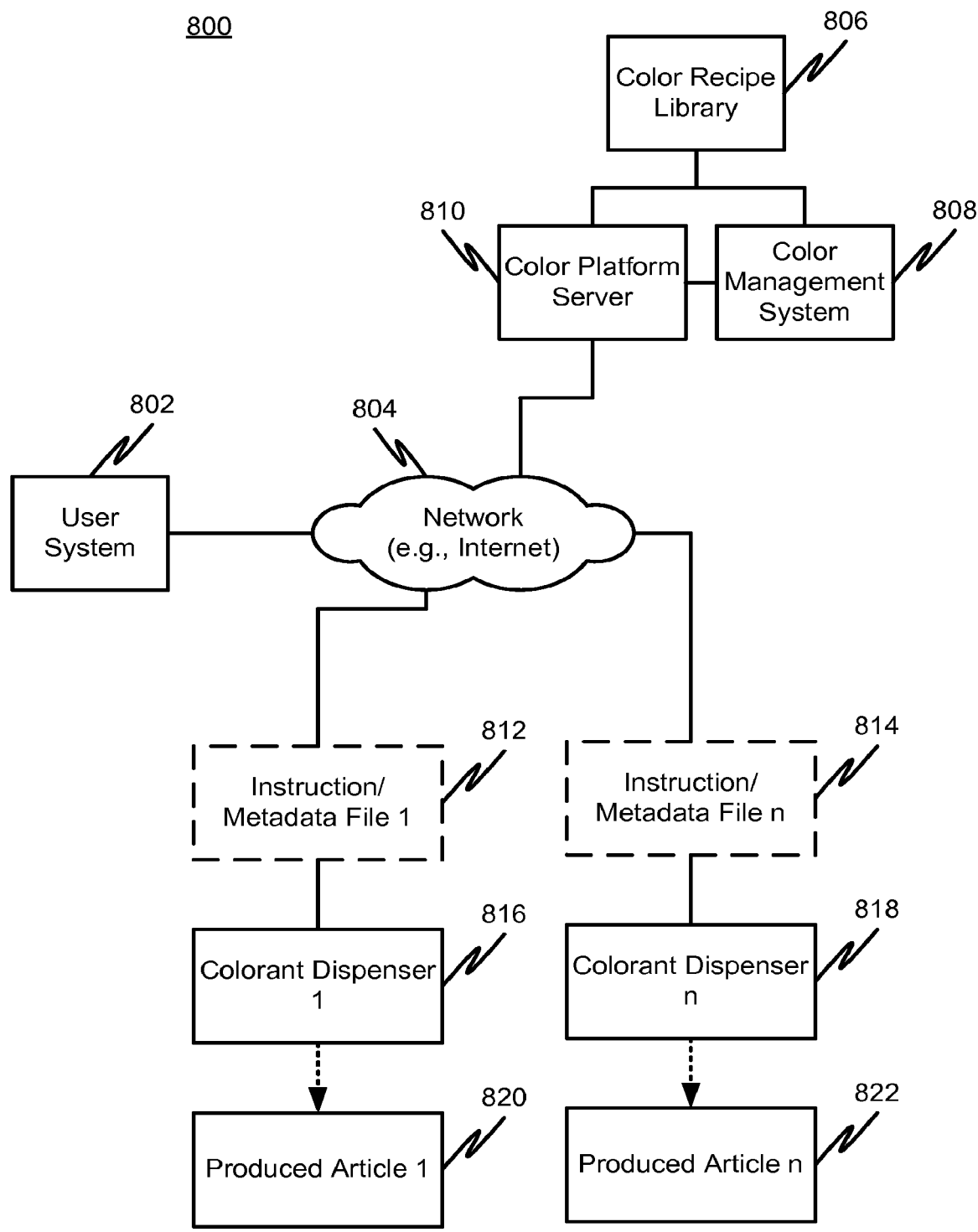
FIG. 8 is a diagram of a web-based color management platform in accordance with some implementations.

FIG. 8 is a diagram of an example web-based color management environment 800 including a user system 802, a network 804, a color recipe library 806, a color management system 808, and a color platform server 810. Also shown in the environment 800 are a plurality of instruction/metadata files (812, 814), a plurality of colorant dispensers (816, 818) and a plurality of produced articles (820, 822).

For example, a designer and/or end customer may provide color direction (e.g., RGB input, L*a*b input, spectral data, or other form of color input) with a user system 802 into a design layer. The color direction can be communicated from the user system 802 to the color platform server 810 via the Internet 804. The color platform 810 can provide the color direction from the user system 802 to the color management system 808, which can perform the color matching for the color direction provided by the user. The color matching process may include accessing stored color recipes from the color recipe library 806.

Once the color matching has been performed, the color platform server 810 can transmit, via the Internet 804, the instruction/metadata file(s) (812,814) to respective colorant dispensers (816, 818) to recreate a color-matched print or dyed product (820, 822) at one or more respective remote locations.

In operation, the color recipe library 806 can be configured to store, track, and retrieve information from the color matching process in order to provide a system for saving the results of matches from customer orders. A finalized color matching instruction/metadata file can be an important asset because the finalized instruction/metadata file contains the color matches that can be used as reference standards for a particular customer using a particular substrate.

Also, if a color has been matched previously (e.g., for another order or substrate) the matched formula can serve as a starting point for color matching on a new substrate. For example, if a color has been matched on cotton twill, it may be reasonable to assume that the finalized colorant recipe can be used as a starting point for performing color matching on cotton duck material. The finalized colorant recipe can be retrieved from the color recipe library 806 and used as a color matching starting point. Thus, potentially reducing a number of iterations that may be required to match a color.

Also, reorders of the finalized matched colors can be used as the color target to match against because starting the matching process from an estimate match could put the final results at a DE in a "wrong direction" in color space. While it may be possible to use color matches from a specific customer or dry run match of all colors using a Color Atlas, these values may typically be used as a starting point to help reduce the number of iterations required to get a match to a specific DE.

Some implementations of the web-based color matching platform can include a browser-based system having an authentication system and an interface for uploading/downloading color matching instruction/metadata files to/from the color recipe library.

In addition to the color recipes, other information may be associated with the color recipes and stored in the color recipe library. The other information can include customer and/or order number, color name, instruction/metadata file name, substrate, color space. The color recipe library can be searched using one or more of the information items mentioned above. Also, the color recipe library 806 can save and catalog raw instruction/metadata files.

Some implementations can include a collection of software services that expose one or more color management features or modules as a web-based color management platform. Central to the software services are the dispenser characterization, color matching, dispenser matching and dispensing instruction generation provided by the color management system 808 (e.g., which may be similar to the color management system 104).

Data produced during the color matching and printing processes can be stored in the color recipe library 806. These data files can then be used to precisely reproduce color between orders, fabric lots, printer variations, and even between different machines.

Some implementations can provide for delivery of manufacture ready order information directly into the color management system 808. Color management functions can be exposed via APIs (or other suitable interface methods) to a cloud computing system.

In some implementations, the color management platform can be hosted on one or more servers (e.g., a cloud server system) with data connections served by HTTP (web) servers.

Some implementations can include a Service Oriented Architecture whereby discreet applications or "services" communicate with one another over a common network protocol over known APIs (application programming interfaces). This architecture is in widespread use today and contributes to positive maintainability, extensibility, straightforward integration with other systems, encapsulation of concerns, as well as facilitates parallel development by decoupled teams on different aspects of the system.

Some implementations can include a gamut limiting service that provides real-time color gamut limiting for a given substrate and dye combination. This service assures that the colors requested for print by customers can be achieved within commercial tolerances, and thereby greatly speeding up the color-matching process.

Some implementations can include a color blending service that can creates a digital "soft proof" simulating a design print on a substrate. This service allows for preview generation for designs with user selected colors.

Some implementations can include a Color Kitchen (or color library), which stores, indexes, and analyzes print data generated during the production of customer orders. This service organizes and makes searchable the institutional color-matching knowledge and can help speed production by providing color recipes for previously matched colors for use as starting points for a new matching process or as the recipes themselves if the color needed to be matched have been matched before and a recipe stored in the color library.

Some implementations can include an order processing service configured to collect and format the data needed to fill customer orders. Some implementations can include a file synchronization service that moves digital assets between one or more cloud storage providers.

Some implementations can include design processing service that takes AVA formatted files (or potentially multilayer TIFF files) and creates "encrypted" layer files. It is the intermediate layer format that all design formats need to go into for the RIP software.

In some implementations, the color recipe library 806 can be transferred to/from cloud storage. Cloud storage provides local file access and syncing as well as API access.

Some implementations can include a web site configured to deliver customer orders to manufacturing. The website implementation can expose manufacturing capabilities to the residential interior design market, for example. The website implementation can use a cut of data from the color recipe library that has been extensively scrubbed to ensure proper licensing.

The website implementation can be responsible for user/customer authentication and management, pricing, transactions, library management, and order preview presentation (among other things). Some implementations can be configured for used for generating custom previews of designs, placing orders for fulfillment, and providing color information for presentation to the user.

An example implementation having a single-constant Kubelka-Munk theory model is described herein for illustration purposes. It will be appreciated that the systems, methods and computer readable media for color matching and colorant dispenser control described herein can use one or more models based on one or more optical physics theories including, but not limited to, radiative transfer theory (two-flux, three-flux and n-flux theories), Kubelka-Munk (single and double constant), other turbid medium theories, other reflectance theories, and variants of the above-mentioned theories.

In some implementations, color matching can begin with a system build-up characterization of the colorants on substrate for a set of colorants (e.g., inks), a substrate and its pretreatment, a particular colorant dispenser (e.g., inkjet printer) and its operational mode, as well as the post-treatment of the substrate (e.g., printed fabric). Build-up characterization of a colorant can include applying, via a colorant dispenser, a set of color sections where each successive color section includes a known change in the concentration of the colorant.

The color blocks can be measured with a spectrophotometer for spectral reflectance factors. A build-up table relating concentration to measurement can be created for each colorant in terms of scattering coefficients and absorption coefficients. The build-up table may be used for colorant recipe calculation. If the measurements do not produce a visually linear gradation of the colorants (e.g., as measured by a spectrophotometer), adjustments may be made to the color concentrations and the application/measurement cycle repeated until an acceptable gradation is obtained. A goal of build-up characterization is to obtain, for each primary colorant, a concentration to measurement build-up table.

Before performing a system characterization, one or more build-up characterization parameters may be set for a colorant. These build-up characterization parameters can include a number of steps in the build-up characterization (e.g., a number of color sections to print, dispense or apply for a colorant), an index for the physical colorant slot in the colorant dispenser (e.g., digital printer) being characterized, and an error metric used to measure differences between steps.

As used herein, a mixture can refer to a physical embodiment (e.g., by weight) of a recipe, which can include a vector of colorant percentages. Also, it will be appreciated that the CMYK colorant set is used herein as an illustrative example and that other colorants may be used.

In some implementations, building up a color for a pixel (or printed dot) can include a simulation of a conventional press operation. In conventional printing (e.g., gravure or rotary screen), a cell on a cylinder/screen can represent a volume of ink/dye to apply to the substrate at a particular pixel location. Each cylinder/screen can represent a layer and each layer can have an ink/dye solution. As the substrate passes by each cylinder/screen the cell size can deliver the amount of solution at the pixel location specified for the pixel. The volume of solution represents a tone of the assigned color for the layer. The solution for each layer consists of a recipe of primary colorants mixed together. In some implementations, a similar operation (e.g., blending) allows digital dispensing (e.g., digital printing via an inkjet printer or the like) to mimic a conventional process. For example, a system can include one or more layers each having an assigned color recipe. As each layer is blended (mathematical operations for blending explained below), the recipe for each pixel in a layer is added/adjusted to the final recipe for pixel to be printed.

For example (using matrix notation): For a three layer design (3 cylinders/screens in conventional printing):
Layer 1 has a recipe of 50% C 20% M or |50 20 0 0|
Layer 2 has a recipe of 20% C 20% Y or |20 0 20 0|
Layer 3 has a recipe of 29% K of |0 0 0 29|

Considering a final printed pixel at location (10, 10) which has a full (maximum cell size):

When layer 1 is blended, the print pixel's recipe is 50% C 20% M or |50 20 0 0|;

When layer 2 is blended, the print pixel's recipe is 70% C 20% M 20% Y or |70 20 20 0|;

When layer 3 is blended, the print pixel's recipe is 70% C 20% M 20% Y 29% K or |70 20 20 29|.

For example:

$$\begin{aligned}|C|\\|M|\\|Y|\\|K|\end{aligned} = \begin{aligned}|50|\\|20|\\|0|\\|0|\end{aligned} + \begin{aligned}|20|\\|0|\\|20|\\|0|\end{aligned} + \begin{aligned}|0|\\|0|\\|0|\\|29|\end{aligned} = \begin{aligned}|70|\\|20|\\|20|\\|29|\end{aligned}$$

This can permit an implementation to produce a recipe to mimic the conventional print fall-on appearance with digital printing for flat designs. In some implementations, tones within a layer file can be represented by grayscale values, where a 100% tone is black and 0% is substrate. On the cylinder (in conventional printing), tones are represented by engraved cells, where the maximum cell size represents 100% tone and no cell represents substrate. In some implementations, an engraving curve (LUT or lookup table) for each layer can be used to map the digital tone values to matching tone cell sizes for an engraved cylinder. Some implementations can produce a recipe for digital printing or dispensing which will match a pixel printed conventionally in terms of tonal gradation.

Using the previous example but assuming a 50% tone for layer 1 and a 20% tone for layer 2:

$$\begin{aligned}|C|\\|M|\\|Y|\\|K|\end{aligned} = \begin{aligned}|50|\\L1(50)\ |20|\\|0|\\|0|\end{aligned} + L2(20)\ \begin{aligned}|20|\\|0|\\|20|\\|0|\end{aligned} + \begin{aligned}|0|\\|0|\\|0|\\|29|\end{aligned}$$

If the engraving curves are linear:

$$\begin{aligned}|C|\\|M|\\|Y|\\|K|\end{aligned} = \begin{aligned}|50|\\50\%\ |20|\\|0|\\|0|\end{aligned} + 20\%\ \begin{aligned}|20|\\|0|\\|20|\\|0|\end{aligned} + \begin{aligned}|0|\\|0|\\|0|\\|29|\end{aligned} = \begin{aligned}|29|\\|10|\\|4|\\|29|\end{aligned}$$

If the engraving curves are non-linear (e.g., a 50% tone in layer 1 is represented by a 30% cell size and a 20% tone in layer 2 is represented by a 10% cell size):

$$\begin{aligned}|C|\ |50|\ |20|\ |0|\ |17|\end{aligned}$$

-continued $$\begin{aligned}|M| = 30\%\ |20| + 10\%\ |0| + |0| = |6|\\|Y|\ |0|\ |20|\ |0|\ |2|\\|K|\ |0|\ |0|\ |29|\ |29|\end{aligned}$$

With the above approach, some implementations can produce a recipe to mimic the conventional print fall-on appearance with digital printing for tonal designs.

In some implementations, color matching can be performed for colors assigned to the layers. Tones within each layer can be simply cuts or percentages for the assigned color recipe for the layer. This can reflect conventional printing where a tonal value of any given pixel is determined by the volume of solution delivered by the cylinder cell (via cell size).

In some implementations, an opacity function can be utilized to mimic a conventional wet-on-wet printing process wherein the strength of a fall-on pixel is reduced by some amount. This function can be based on the coverage (e.g., amount of ink already dispensed) at the time the opacity is applied. For example, is a first layer has a recipe of 50% C 30% M; the pixel being printed is a 50% tone, then the print pixel recipe after the first layer would be 25% C 15% M with a 50% coverage. Continuing with the example, the next layer has a pixel with a recipe of 20% C 30% Y, a 100% tone, and the opacity value for a 50% coverage is 25%; then the reduction factor for the pixel falling-on is 100-25 or 75%. The recipe after the layer falls-on to the first layer would be computed as 25% C 15% M+75% of (20% C 30% Y) giving a print recipe of 40% C 15% M 22.5% Y, represented by:

$$\begin{aligned}|C|\\|M|\\|Y|\\|K|\end{aligned} = L1(50)\ \begin{aligned}|50|\\|30|\\|0|\\|0|\end{aligned} + [100 - O(50)]\ \begin{aligned}|20|\\|0|\\|30|\\|0|\end{aligned} = \begin{aligned}|40|\\|15|\\|22.5|\\|0|\end{aligned}$$

Opacity values can be determined via a print process profiling at the print production site. The print process profiling method can create information regarding print production properties including color gamut, color fall-on and color absorption.

Figure 9:
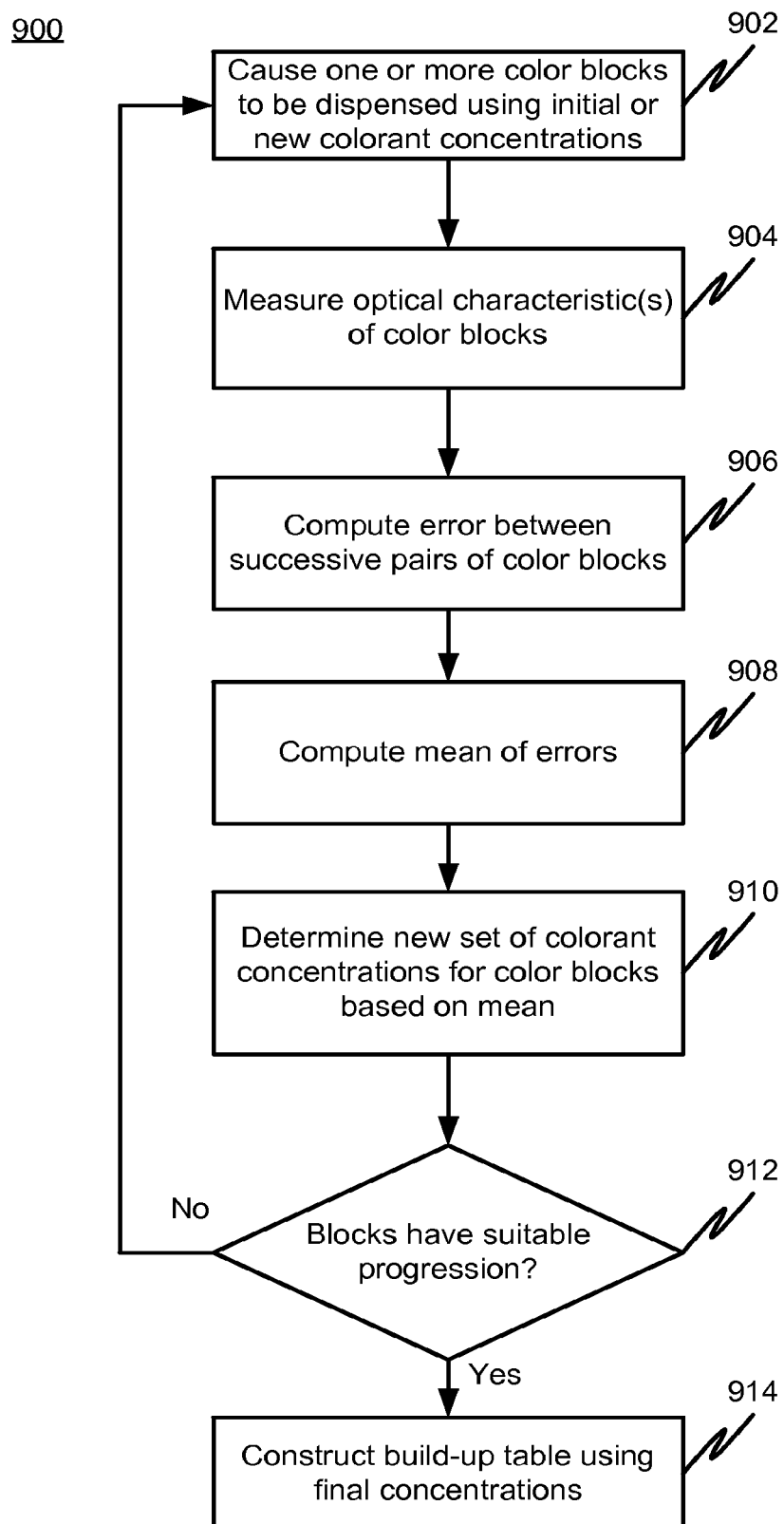
FIG. 9 is a chart of an example colorant dispenser characterization method in accordance with some implementations.

FIG. 9 is a chart of an example colorant dispenser characterization method 900 in accordance with some implementations. The colorant dispenser characterization method 900 may be used, for example, to characterize a particular combination of a colorant dispenser (e.g., a digital printer), a dispenser mode of operation, a substrate, and one or more colorants (e.g., inks or dyes). The dispenser may have one or more ink slots effective to dispense colorant onto a substrate. The dispenser may be configurable to control the amount of colorant dispensed from the one or more colorant slots. Example substrates may include paper, fabric, yarn, string or the like. Processing begins at 902 where colorant is dispensed onto the substrate to produce a row of color blocks (or sections) (e.g., FIG. 5). The row of color blocks may include two or more color blocks. For example, a row of color blocks is dispensed (e.g., printed) may be printed according to the number of steps parameter for digital output decreasing from 100% to 0% (substrate) from the colorant slot specified. Processing continues to 904.

At 904, optical characteristics of the row of color blocks are measured. In some examples, optical characteristics (e.g., reflectance) may be measured with a spectrophotometer. The primary optical parameters (or characteristics) measured by a spectrophotometer can include spectral reflectance factors for reflecting objects and spectral transmittance for transparent objects. The wavelength range may be extended from the visible range into near UV or near Infra-Red. Spectrophotometers designed to measure spectral reflectance factors for reflecting objects are further classified into sphere based spectrophotometers and bi-directional type spectrophotometers. A sphere based spectrophotometer can illuminate the sample by perfectly diffusing light and the reflected light is collected at an 8 degree angle to the normal of the sample surface. On the other hand, the bi-directional type spectrophotometer illuminates the sample surface at a specific direction (typically either 45 degree or normal) and the reflected light is collected at a specific direction (e.g. normal or 45 degree). Another type of spectrophotometer includes a gonio-spectrophotometer which also measures spectral reflectance factors and may permit varying the illuminating and viewing angles. Processing continues to 906.

At 906, error between each color block and its adjacent color block in the row of color blocks is computed using the error metric parameter. Processing continues to 908.

At 908, a mean of the errors is computed. A goal of the characterization is to minimize the magnitude of the difference between each neighboring pair of color blocks and the mean of the errors. Processing continues to 910.

At 910, a new set of colorant concentrations for the color block steps is calculated such that the error between steps approaches the mean. In order to accomplish this, the current set of spectrophotometer readings (and possibly previous sets) can be used to construct a preliminary build-up table for the colorant. This preliminary table can be used to make predictions for proposed concentrations using the color matching process described below in connection with FIG. 11. Proposed concentrations can be computed by incrementing the amount of colorant at a previous block or substrate until the error metric computes a value close to the mean error computed in 908.

An alternative method to calculate the new set of colorant concentrations can include: measuring the error between substrate and each concentration (e.g., color block); conducting a regression analysis between the error metric and the corresponding concentration; and calculating proposed concentrations based on the regression analysis. Processing continues to 912.

At 912, it is determined whether the color blocks have a suitable progression including a colorimetric progression and a spectral progression. A suitable progression can include, for example, a uniform colorimetric progression and/or a uniform spectral progression of the optical properties of the color blocks (e.g., based on spectrophotometer readings). If the color blocks have a suitable progression, processing continues to 914. Otherwise, processing continues to 902.

At 914, a final set of concentrations and their associated measurements are used to construct a build-up table for the colorant. A final set of concentrations can include those concentrations that result in a suitable progression.

Once build-up tables for each colorant are available, some implementations may have enough information to match colors to respective target colors. A first step in color matching may be conversion of build-up table(s) into values which can be used in additive mixing equations. The Kubelka-Munk single constant model will be used to illustrate the disclosed color matching process.

Kubelka-Munk single constant equations:

$$K/S = (1-R)^2/2R$$

where R is the measured reflectance and K/S is the ratio of absorption coefficient to scattering coefficient. Note that R, R' and K/S are values as a function of wavelength.

$$(K/S)_m = \sum c_i (k/s)_i + (K/S)_t$$

Where
i=1 . . . number of primaries
k/s is the K/S at unit concentration.
$c_i$ is the concentration of the $i^{th}$ primary
$(K/S)_t$ is the ratio of absorption coefficient to scattering coefficient for the substrate, and
$(K/S)_m$ is the resulting ratio of absorption coefficient to scattering coefficient for the mixture.

$$R' = 1 + (K/S)_m \cdot ((K/S)_m ((K/S)_m + 2))^{0.5}$$

where $(K/S)_m$ is the predicted ratio of absorption coefficient to scattering coefficient for the mixture and R' is the predicted reflectance of the mixture.

Normally, in the Kubelka-Munk single constant model, a $(K/S)_\lambda$ value is computed for each colorant at each wavelength k. When mixing the colorants, the $(K/S)_\lambda$ values of the colorant are multiplied by its concentration in the mixture recipe. The results of these multiplications are summed and added to the $(K/S)_\lambda$ values of the substrate $[(K/S)_t]$ giving the $(K/S)_\lambda$ values of the mixture $[(K/S)_m]$.

In digital printing and conventional press printing, many of the colorants exhibit non-linearity in their build-up measurements. Because of this non-linearity, some implementations can include a different approach to the Kubelka-Munk equations from the conventional approaches.

Figure 10:
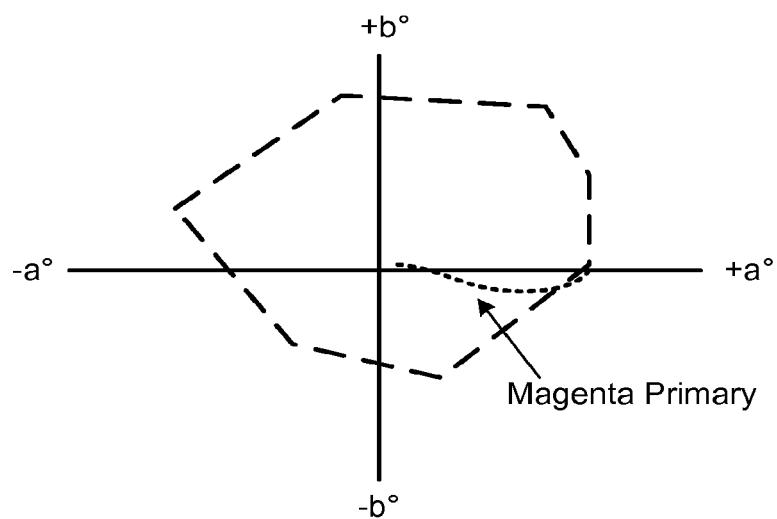
FIG. 10 is a diagram of an example colorant exhibiting non-linear build-up characteristics.

FIG. 10 shows an example of a Magenta colorant primary that exhibits the non-linear build-up from the neutral center of the CIE L*a*b* chromaticity diagram to the color gamut edge of the primaries used. In some implementations, the build-up table for each colorant is converted into a $((K/S)_m-(K/S)_t)$ table of values. That is, the build-up tables relating concentration to reflectance measurement become tables relating concentration to $((K/S)_m-(K/S)_t)$ values.

In some implementations, before producing a prediction for a mixture's recipe, mixing parameters are specified (e.g., by a user or software desiring the prediction) that may constrain predictions at the recipe level. The parameters can include:

1. Total amount of all the colorants (e.g., sum of all colorant concentrations) allowed within a recipe as a percentage (e.g., each colorant in the recipe can have a concentration range from 0.0% to 100.0%).

2. Minimum amount of total colorant (e.g., sum of all colorant concentrations) allowed.

3. CIE Illuminant and CIE Standard Observer conditions for setting up the CIE L*a*b color space being used for evaluation. These conditions can include a pair of values: an illuminant spectral power distribution (SPD) and an observer (CIE defined table known as a color matching function table or CMF table).

For each possible colorant in a mixture's recipe the following mixing parameters are specified (by another system or by the user of or software desiring the prediction) at the individual colorant level:

1. The total amount of the colorant which may appear within the recipe of a mixture.
2. The minimum amount of the colorant which may appear within the recipe of a mixture when no other colorants are present.
3. The minimum amount of the colorant which may appear within the recipe of a mixture when other colorants are present.
4. Whether the colorant is enabled or disabled. That is, if disabled, its contribution for the mixture's recipe prediction is zero, regardless of the value present in the mixture's recipe; otherwise, the value present in the mixture's recipe is used.

Figure 11:
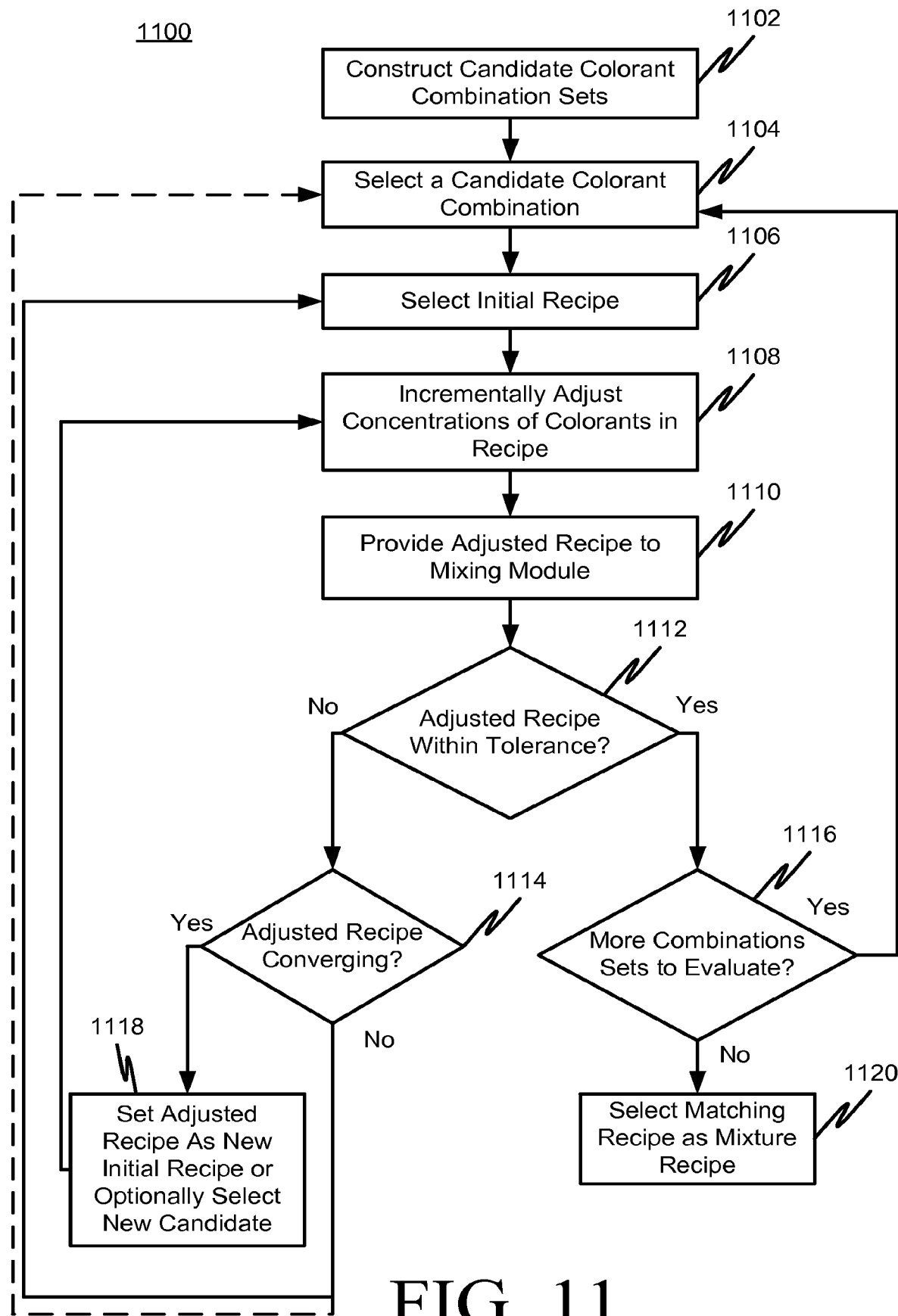
FIG. 11 is a chart of an example color matching recipe generation method in accordance with some implementations.

FIG. 11 is a chart of an example color matching recipe generation method 1100 in accordance with some implementations. Processing begins at 1102 where candidate sets of colorant combinations are constructed in which to search for a recipe which will produce printed output (e.g. as characterized by CIE L*a*b coordinates) within a defined tolerance of the target. Individual primary colorants (e.g., single colors) may be included or excluded from the combinations in order to reduce matching time. Processing continues to 1104.

At 1104, a candidate set of colorant recipes (or combinations) is selected for evaluation. We select those colorant primaries with polygons in the CIELAB color space that enclose the color target as initial candidate set. In addition, one or more of the error metrics described above can be used to select one or more colorant combination sets for evaluation. Processing continues to 1106.

At 1106, an initial recipe is selected (e.g., substrate, an existing recipe, or a randomized recipe). Processing continues to 1108.

At 1108, concentrations of the colorants in the recipe (individually and in combinations) are incrementally adjusted to obtain an adjusted recipe. Increments can be made starting at a coarse value of, for example, 1 percent and proceeding to finer increments when no further progress at the current increment is observed. For example, each finer increment can be computed by dividing by 10 for the next iteration of incrementing. Processing continues to 1110.

At 1110, the adjusted recipe is provided to the mixing module. Processing continues to 1112.

At 1112, using defined closeness conditions (e.g., error measurement, metamerism, inconstancy), CIE L*a*b* coordinates predicted by the adjusted recipe are compared with those of the given target CIE L*a*b* coordinates. If the adjustment results in CIE L*a*b* coordinates within a defined tolerance, the recipe is considered a match and processing continues to 1116. Otherwise, processing continues to 1114.

At 1114, in some implementations, it is determined whether the adjusted recipe is converging to the given target CIE L*a*b* coordinates. For example, CIE L*a*b* coordinates predicted by each successive adjusted recipes can be compared with the target and if the most recent prediction is closer to the target than its predecessor (e.g. immediate predecessor), an adjusted recipe is determined to be converging. Else, it is determined to not be converging. There are other tests for convergence that can be selected (or determined) based on a type of color matching that has been specified. For example, in Delta E color matching, a prediction is converging toward the target if an adjustment results in a Delta E error between the prediction and the target is smaller than the Delta E between the unadjusted prediction and the target (under the first illuminant/observer pair). In Metamerism Index color matching, a prediction is converging toward the target if an adjustment results in the maximum Metamerism Index computed for the specified illuminant/observer pairs is decreasing when compared to the maximum Metamerism Index computed using the unadjusted prediction.

In Metamerism Delta E color matching, a prediction is converging toward the target if an adjustment results in the maximum Metamerism Delta E computed for the specified illuminant/observer pairs is decreasing when compared to the maximum Metamerism Delta E computed using the unadjusted prediction.

In number of primaries color matching and volumetric color matching, the Delta E color matching condition is used. In number of primaries color matching, a prediction is converging toward the target if an adjustment results in a Delta E error between the prediction and the target is smaller than the Delta E between the unadjusted prediction and the target (under the first illuminant/observer pair). When the Delta E metric is at or below the acceptable setting (or 1.0 if not set), the number of primaries in the recipe determines which recipe is selected (the recipe with the lowest number is chosen).

In Volume color matching, a prediction is converging toward the target if an adjustment results in a Delta E error between the prediction and the target is smaller than the Delta E between the unadjusted prediction and the target (under the first illuminant/observer pair). When the Delta E metric is at or below the acceptable setting (or 1.0 if not set), the colorant volume (e.g., total ink volume—sum of the volume of all primaries in the recipe greater than 0) in the recipe can determine which recipe is selected (the recipe with the lowest number is chosen). If the adjusted recipe is converging, processing continues to 1118 where the adjusted recipe is utilized as the initial recipe and processing continues to 1108. Otherwise, processing continues to 1106 or optionally to 1104 if it is determined that adjusted recipes from the current initial recipe selection are failing to converge.

At 1116, it is determined whether there are more colorant combination sets to evaluate. If so, processing continues to 1104. If not, processing continues to 1120.

At 1120, in order to determine whether the combination of colorants produced a recipe that meets specified conditions (e.g., reflectance), the combination is compared with the recipes produced by previous iterations and the one meeting the specified conditions most closely is marked as the matching recipe. If more combinations in the set of colorant combinations remaining, processing continues to 1104. Otherwise, the recipe that most closely meets the specified conditions is set as the mixture recipe.

Figure 12:
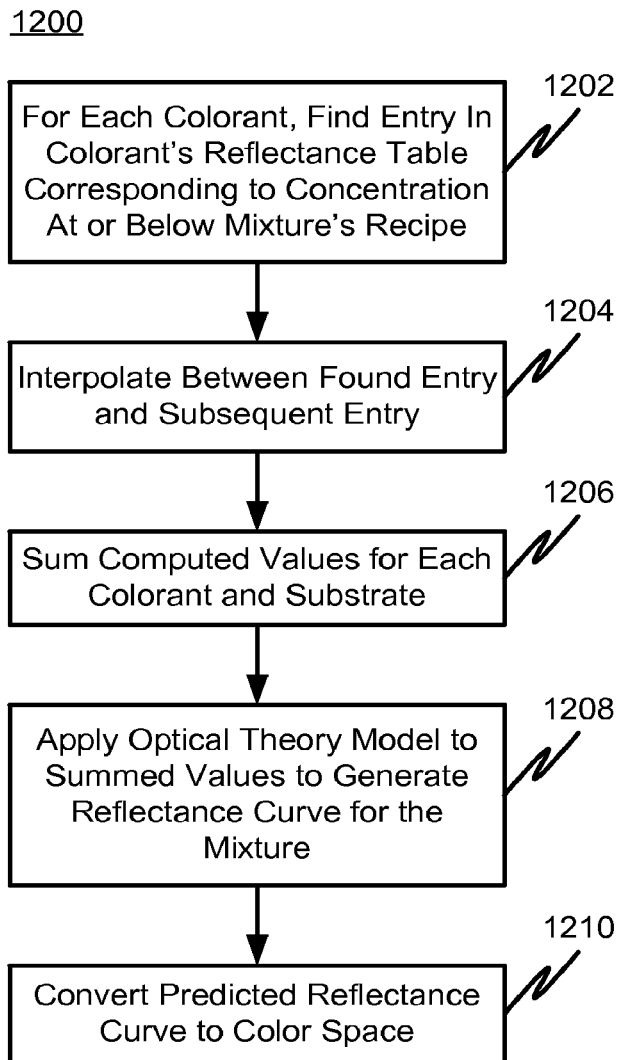
FIG. 12 is a chart of an example colorant mixing method in accordance with some implementations.

FIG. 12 is a chart of an example colorant mixing method 1200 in accordance with some implementations. The colorant mixing method can permit some implementations to predict a mixture's recipe even though the colorants may be nonlinear in their build-up measurements.

Processing begins at 1202 where for each colorant, the system finds an entry in the colorant's $((K/S)_m-(K/S)_t)$ table corresponding to a concentration that is at or below the concentration in the mixture's recipe for the colorant. Processing continues to 1204.

At 1204, using the found entry and the one immediately next, an interpolation between the two sets of values is determined to compute the $((K/S)_m-(K/S)_t)$ values for the colorant's concentration within the mixture's recipe. The interpolation can be performed using, for example, piecewise linear interpolation or other suitable interpolation technique. Processing continues to 1206.

At 1206, the computed $((K/S)_m-(K/S)_t)$ values of each colorant and the substrate are summed, to produce a set of $(K/S)_\lambda$ values for the mixture. Processing continues to 1208.

At 1208, using the $(K/S)_\lambda$ values computed for the mixture, an optical theory model is applied (e.g., the Kubelka-Munk equation (10)) to generate a prediction reflectance curve for the mixture. Processing continues to 1210.

At 1210, the generated prediction reflectance curve is converted into a color space, e.g., CIE L*a*b color space. It will be appreciated that other color spaces such as 1976 CIELUV or Munsell color space.

Figure 13:
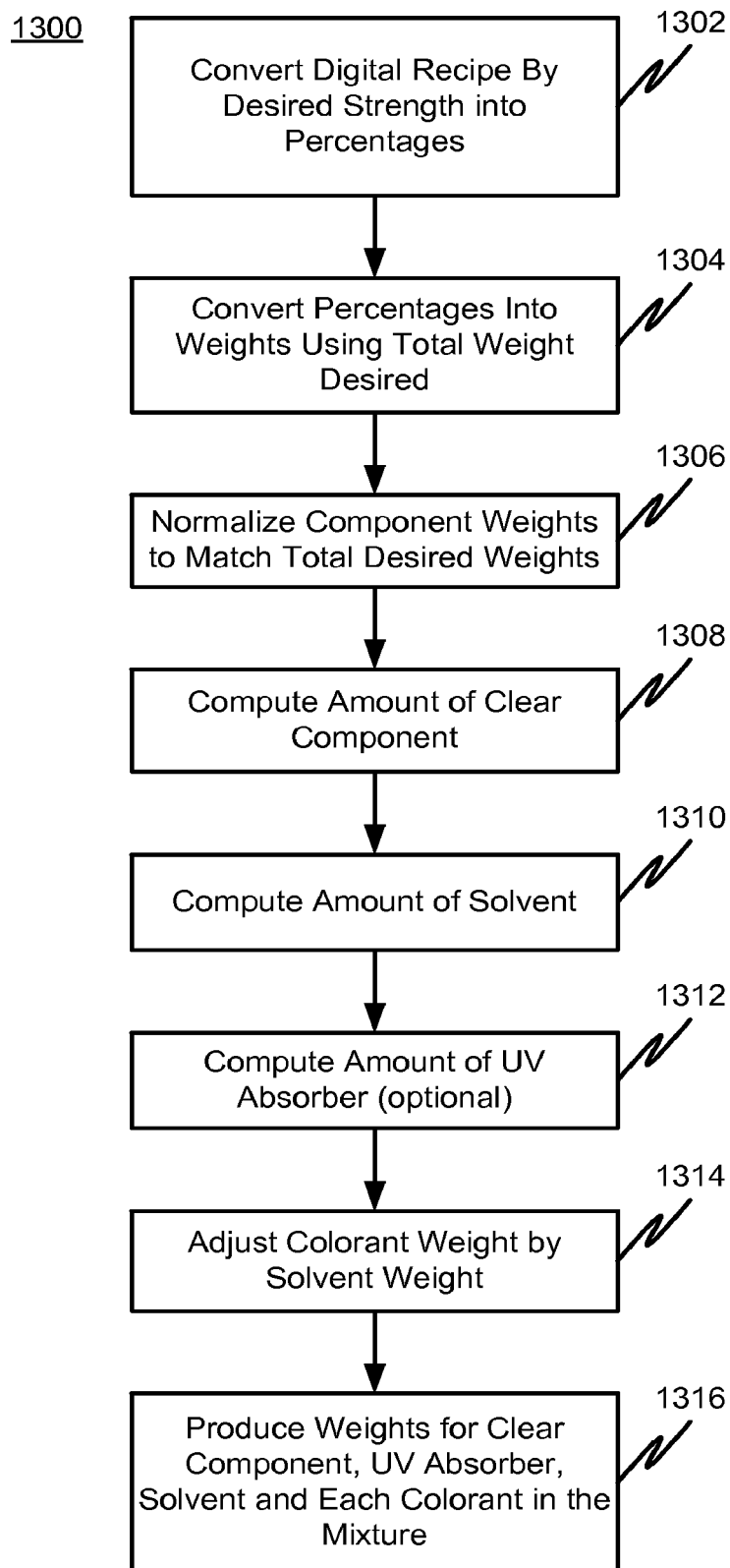
FIG. 13 is a chart of an example colorant recipe conversion method in accordance with some implementations.

FIG. 13 is a chart of an example colorant recipe conversion method 1300, based on a solvent gravure print operation, in accordance with some implementations. When converting a color recipe (e.g., for a digital colorant dispenser) into a conventional mixture recipe (e.g. solvent based gravure print operation) based on weights, some implementations may use the following settings:
1. Strength percentage factor;
2. Ultraviolet (UV) Absorber percentage factor;
3. Solvent factors for the colorants being used; and
4. Total weight desired for the mixture.

Processing begins at 1302 where the digital recipe specified colorant strengths are converted into percentages. Processing continues to 1304.

At 1304, the percentages computed in 1302 are converted into weights using total weight desired. Processing continues to 1306.

At 1306, the component weights are normalized to match the desired total weigh (e.g., proportional adjustment of components). Processing continues to 1308.

At 1308, an amount of clear component (or extender) is computed. Processing continues to 1310.

At 1310, an amount of solvent is computed using solvent factors for the colorants used in the recipe. Processing continues to 1312.

At 1312, an amount of UV absorber (if any) is computed and the extender amount is adjusted to accommodate the UV absorber. Processing continues to 1314.

At 1314, colorant weights are adjusted by solvent weight. Processing continues to 1316.

At 1316, weights are produced for clear component, UV extender, solvent, and each colorant in the mixture. It will be appreciated that a similar conversion can be applied to a piece-dyeing operation, for example.

In another example, a process can begin by identifying a target color. The target color can be entered manually (e.g., in terms of CIE L*a*b* values), read with a spectrophotometer, or come from a digitally printed color as described herein (in which case a digital recipe may exist for a digital print not a conventional process). When the target color is obtained from a digitally printed color, the input can be loaded from an instruction/metadata file used for digital printing and can have the reflectance curve for the color as well as the recipe used for digital printing.

If the target color is a color which was previously printed digitally and the colorants being used in the conventional process are identical or similar to the colorants used for the digital print, a digital recipe can be constructed for the conventional process by match each colorant's contribution in the digitally printed recipe to the colorant in the conventional process. For example, if a color was produced on a digital printer with 5% cyan and 2% magenta, the color matching process can be executed twice (e.g., utilizing the buildup characterization tables for the colorants in the conventional process). Once to match the L*a*b* value of the 5% cyan (digital print) and again to match the 2% magenta (digital print). This would transform the digital recipe to about 4.5% cyan and 3% magenta. The recipe would still be a digital recipe and would need to be converted into a conventional recipe/mixture.

If the target color was manually entered, read with a spectrophotometer, or not mapped from digital printing recipe to conventional recipe as described in the preceding paragraph; then, the target color may be matched as described above using the buildup characterization tables for the colorants of the conventional process.

In another example, the conversion process can be represented mathematically as follows:

$$\begin{aligned}
\text{Solvents} &= X = |x_0| = WTI(1.0 - S) \\
&\quad |x_1| \\
&\quad |x_2| \\
&\quad |x_3| \\
&\quad |x_4| \\
&\quad |x_5| \\
&= |0.81||100000|(1-|0.6|) \\
&\quad |0.0||010000||0.725| \\
&\quad |1.29||001000||0.63| \\
&\quad |9.57||000100||0.85| \\
&\quad |0.21||000010||0.8| \\
&\quad |4.23||000001||0.725| \\
&= |0.81|T|0.4\ 0\ 0\ 0\ 0\ 0| \\
&\quad |0.0||0\ 0.275\ 0\ 0\ 0\ 0| \\
&\quad |1.29||0\ 0\ 0.37\ 0\ 0\ 0| \\
&\quad |9.57||0\ 0\ 0\ 0.15\ 0\ 0| \\
&\quad |0.21||0\ 0\ 0\ 0\ 0.2\ 0| \\
&\quad |4.23||0\ 0\ 0\ 0\ 0\ 0.275| \\
&= |0.324| \\
&\quad |0.0| \\
&\quad |0.4773| \\
&\quad |1.4355| \\
&\quad |0.042| \\
&\quad |1.16325|
\end{aligned}$$

$$\text{Total solvent} = \sum_{i=0}^{5} x_i = 3.44205$$

Adjust weight by solvents:

$$W' = W - X = |0.81| - |0.324| = |0.486|$$
$$|0.0||0.0||0.0|$$
$$|1.29||0.4773||0.8127|$$
$$|9.57||1.4355||8.1345|$$
$$|0.21||0.042||0.168|$$
$$|4.23||1.16325||3.06675|$$

$$\text{Amount of extender } E = t - \left(\sum w'_i + \sum x_i\right)$$
$$= 100 - 16.11$$
$$= 83.89$$

$$\text{UV Absorber} = U = t * u = 100 * 0.01 = 1$$

Adjust extender for UV absorber addition:

$$E - U = 83.89 - 1 = 82.89$$

Final solution (rounded)

| | |
|---|---|
| Extender | 82.90 grams |
| UV absorber | 1.0 gram |
| Solvent | 3.44 grams |
| C | 0.49 grams |
| M | 0.0 grams |
| Y | 0.81 grams |
| K | 8.13 grams |
| V | 0.17 grams |
| O | 3.07 grams |

Some implementations can include dispensing of chemicals/colorants that may not normally be used together, but used in combination to impart unique properties to the spectral properties of a final product. For example, the production of a product requiring unique reflectance properties such as for military applications. In the creation of color for military camouflage it is a common requirement for the colors to have unique spectral reflectance/absorbance properties so as to provide maximum camouflaging properties in different environments. These properties are normally achieved in conventionally produced product by the addition of "carbon black" to the standard colorants used for the production of the final fabric. The addition of carbon black can cause light absorption in the NIR (Near Infrared) range to be controlled to meet the requirements of the military product. In a conventional ICC color managed workflow, it may be difficult or not possible to provide this capability. In some implementations of color matching as described herein, desired properties can be achieved by adding a jettable carbon black into an existing dye set, and by addressing the machine as a dispensing system. Accordingly, colorants and carbon black can be dispensed in the correct ratio on the substrate at the specified locations to achieve the desired product performance.

Some implementations have an advantage of providing visibility to capabilities of the manufacturing process. For example, a user can see displayed an accurate representation of the final product. Also, some implementations can prevent a user from visualizing or creating on a screen a product that cannot be reproduced by the color matching process described herein and including color gamut limit technology.

Some implementations can provide a capability for a user to pick from an 'on the fly' generated color palette that is created from the dyes defined by a chosen profile. Such a palette can permit the user to access any color within the gamut of available dyes, while preventing the user from picking a color outside the capability of the dyes. In this manner, some implementations can reduce or prevent a user from creating or viewing an output that the manufacturing process is not capable of producing. Through the use of formulation technology, some implementations are able to greatly increase the color gamut of the available dyes and may simultaneously reduce the average ink consumption by 55-75% over an ICC color managed workflow.

Some implementations can create an RGB profile that is representative of the color space of the output device, calculating to the capability of the dyes and all of their combinations using the data captured during the print system characterization process. By creating this printer gamut representative profile that is now in a RGB monitor format, the user is able to create and edit an image file while viewing on screen the actual representation of the final product. This capability can also help prevent the user from creating colors that are outside the capability of the printer and may also present the user with accurate numerical color values of the capability of the printer.

Some implementations can provide an ability to match digitally and conventionally produced printed and dyed products. Some implementations can improve capabilities of high speed digital print machines and can create a seamless bridge between conventional and digital print production. Some implementations can provide efficient and accurate communication and creation of color utilizing the internet. Some implementations provide an all digital supply chain from design colorization to final printed product whether in a digital or conventional process. Colorant mixtures created and managed within a system as described herein can be managed as a recipe. Some implementations provide an ability to create color in a method similar to that used in the conventional printing process and to simulate (or match) a conventionally created product.

Some implementations can include a color recipe driven system at a pixel level. The system can mimic (or simulate) a conventional process from which data has been gathered. That is, each layer file of a design image can represent a cylinder/rotary screen in the conventional print operation. For the conventional process, each cell size for each gravure/screen represents a tone in the layer file and vice versa for the digital process. The system can predict and simulate the color build up and mixing of gravure and wet print processes.

Moreover, some implementations can simulate different engraving mechanisms through look up tables and can manage the gamma corrections or changes to gray scale layers. Some implementations can optionally shift each layer independently to simulate trapping appearance of the conventional print operation, giving users flexibility to duplicate a conventional process or to "step out" of the limitations of a conventional process and realize the full creative capability of the application.

In some implementations, data from a colorant build-up characterization can be used to generate a correction curve configured to modify instruction/metadata file information for a colorant dispenser based on information from another, different colorant dispenser so as to cause the two colorant dispensers to produce similar (or the same) output colors for a design. Using a correction curve, output from one or more dispensers can be made to substantially match the output of another dispenser. Output colors from the same or different dispensers having the same or different colorants and substrates can be matched using correction curves.

Some implementations can include a process based on spectral information obtained from two or more colorant dispensers. The process can permit multiple colorant dispensers within the same or different environments to each produce output colors matching (or substantially matching) the output colors of the other colorant dispensers. In some implementations, a single ICC profile can be distributed among multiple colorant dispensers to cause the colorant dispensers to each produce articles bearing colors (e.g., a design) that have the same (or similar) optical properties as the articles produced by the other colorant dispensers.

The implementations described herein can help address a common problem where each colorant dispenser must be profiled independently of the others and therefore output colors from each colorant dispenser may be different. Matching color outputs from various colorant dispensers can permit the use of common recipes in a color management workflow described herein to cause substantially matching outputs to be produced at colorant dispensers provided at two or more remote locations.

Some implementations can include a second form of system characterization. The second form of system characterization can be used to cause the output of a first colorant dispenser (e.g., a digital inkjet fabric printer) to appear identical (or nearly identical) in terms of color to the output of a second colorant dispenser. The second form of system characterization can include using a colorant build-up characterization of the first colorant dispenser as a target for the second colorant dispenser in order to produce a correction table for use on the second colorant dispenser to adjust digital outputs.

Figure 14:
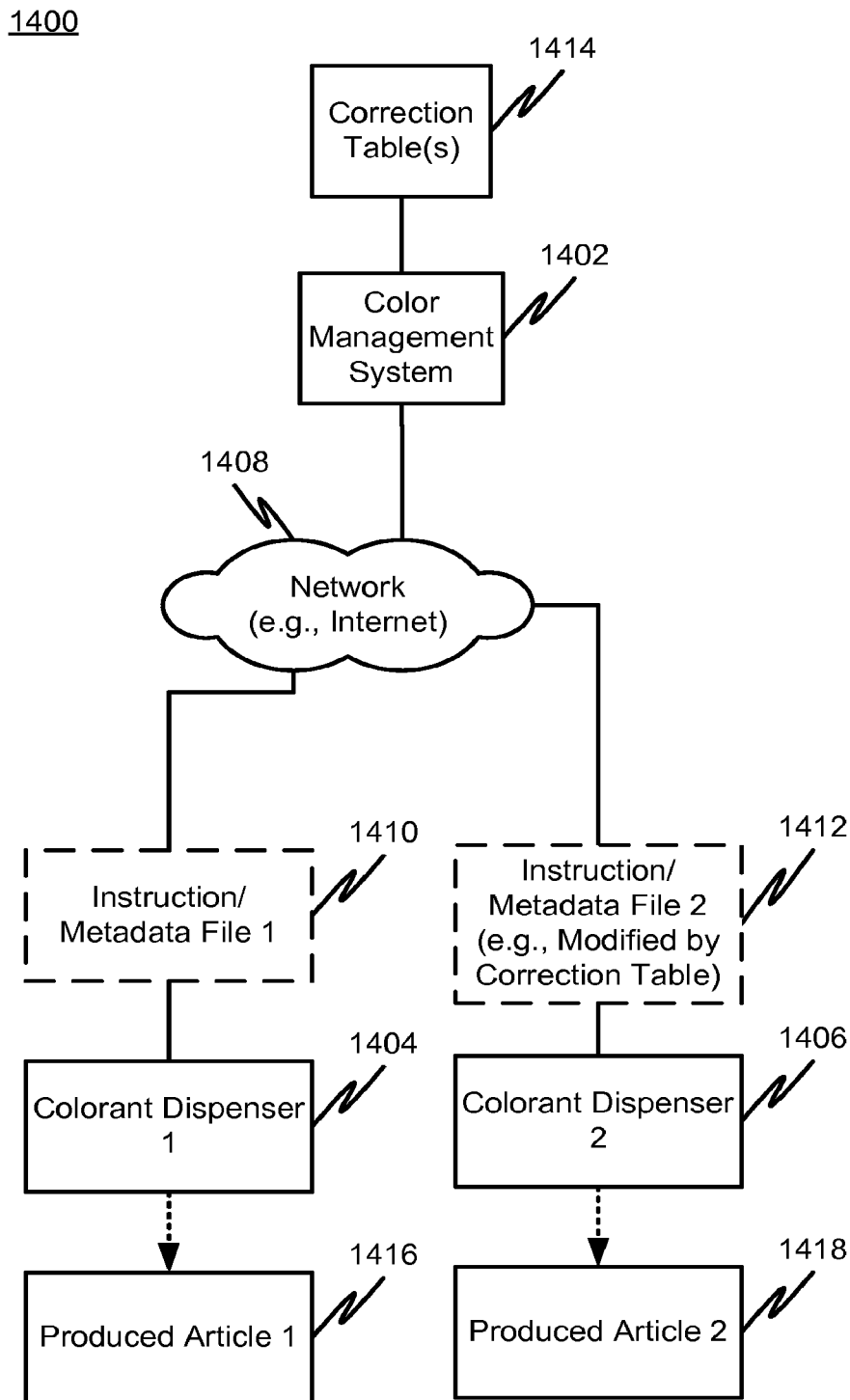
FIG. 14 is a diagram of an example multiple colorant dispenser environment in accordance with some implementations.
Figure 15:
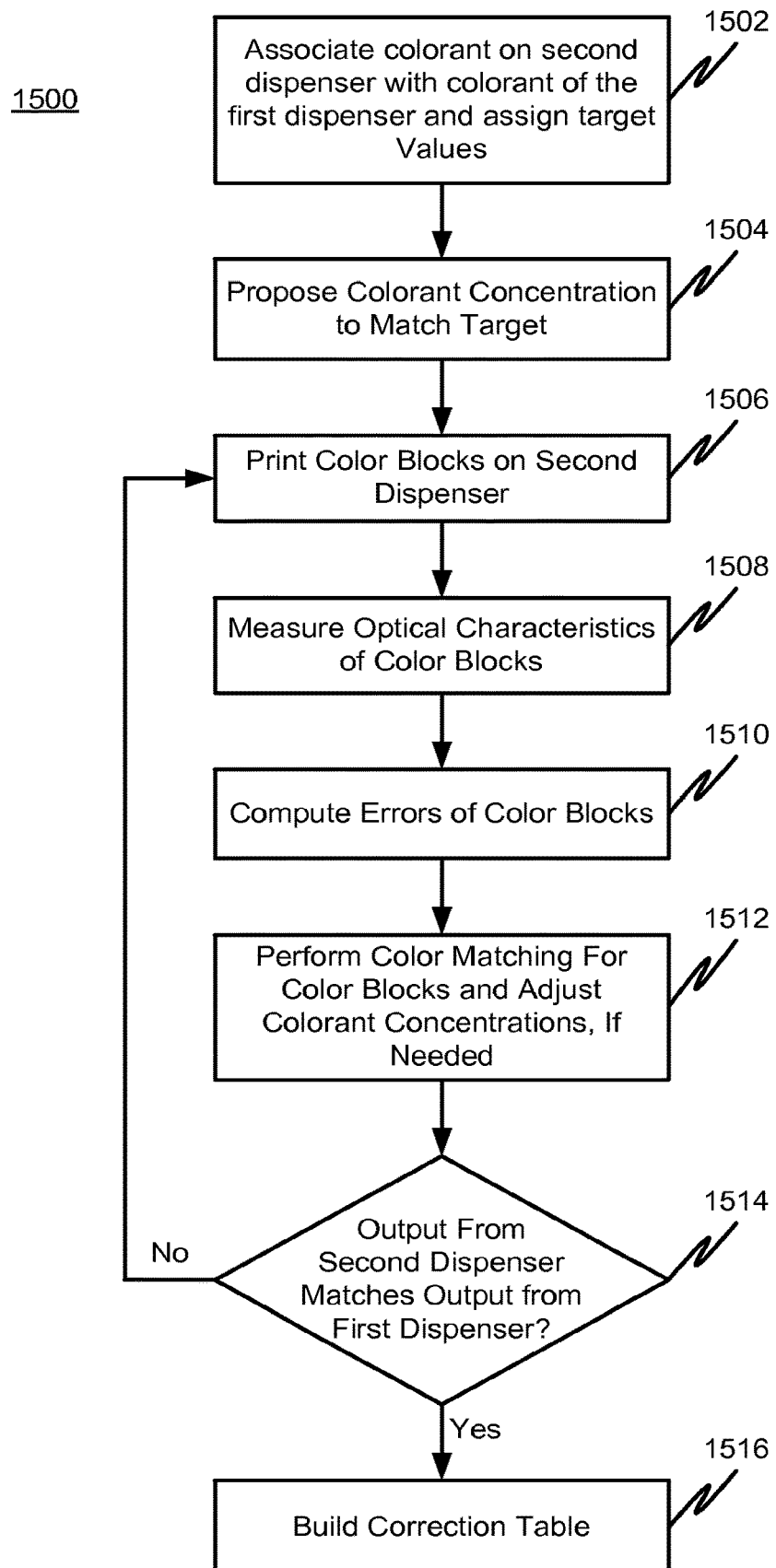
FIG. 15 is a chart of an example colorant dispenser matching method in accordance with some implementations.

FIG. 14 is a diagram of an example multiple colorant dispenser environment 1400 in accordance with some implementations. The environment 1400 can include a color management system 1402, two colorant dispensers (1404, 1406), a computer network 1408 (e.g., the Internet), an instruction/metadata file 1410, a modified instruction/metadata file 1412, one or more correction tables 1414, and articles produced with the method FIG. 15 is a chart of an example colorant dispenser matching method 1500 in accordance with some implementations. Processing begins at 1502 where a colorant on a second colorant dispenser is associated with a colorant on a first colorant dispenser. That is, concentrations for each colorant are initialized to respective concentrations used for colorants on the first dispenser and color values in a color space (e.g., CIE L*a*b) are assigned to each color block successively. This initial set of CIE L*a*b coordinates can serve as target values for the second colorant dispenser. Processing continues to 1504.

At 1504, for each color block step on the second colorant dispenser, a concentration of the colorant is proposed to produce the same CIE L*a*b coordinates as produced on the first dispenser. Processing continues to 1506.

At 1506, the proposed colorant concentrations are dispensed (e.g., by an inkjet fabric printer) from the second dispenser. Processing continues to 1508.

At 1508, optical characteristics of color blocks printed with the second dispenser are measured (e.g. with a spectrophotometer). Based on the measurement, CIE L*a*b coordinates are computed for each color block. Processing continues to 1510.

At 1510, using the CIE L*a*b coordinates for color blocks associated with the colorant as dispensed by the first colorant dispenser and the CIE L*a*b coordinates for color blocks as dispensed by the second colorant dispenser (e.g., as computed at 1508), second dispenser errors are computed using a specified error metric. Error metrics can include one or more equations for quantizing the error between a predicted and target (reference) color (e.g., CIE 1976 color difference formula, CIE 1994 color difference formula, CIE DE2000 color difference formula, CMC color difference formula or other suitable formulas). The error metric can also include any factors required by the choice of equation(s) made in step 1 above. (For example, the CIE DE2000 color difference equations can have factors 1, c, and h for adjusting differences in the luminance, chroma, and hue). Processing continues to 1512.

At 1512, adjustments are proposed to the concentrations on the second machine so that the errors are minimized. In order to accomplish this, the spectrophotometer readings collected 1508 can be used as a preliminary build-up table and adjustments can be predicted using the color matching process described above. Processing continues to 1514.

At 1514, it is determined whether output of the second dispenser matches output of the first dispenser (e.g., in CIE L*a*b color space). If the second dispenser output does not match the first dispenser output (e.g., error metric within a given threshold or tolerance), processing continues to 1506. If the second dispenser output matches the first dispenser output (e.g., error metric within a given threshold or tolerance), processing continues to 1516.

At 1516, a final set of concentrations on the second machine are used to build a correction table mapping the concentrations used on the first machine to concentrations needed on the second in order to produce an equivalent tone (e.g., color build-up tone) between the first and second machine (or among any two or more machines) as computed by the error metric.

Figure 16:
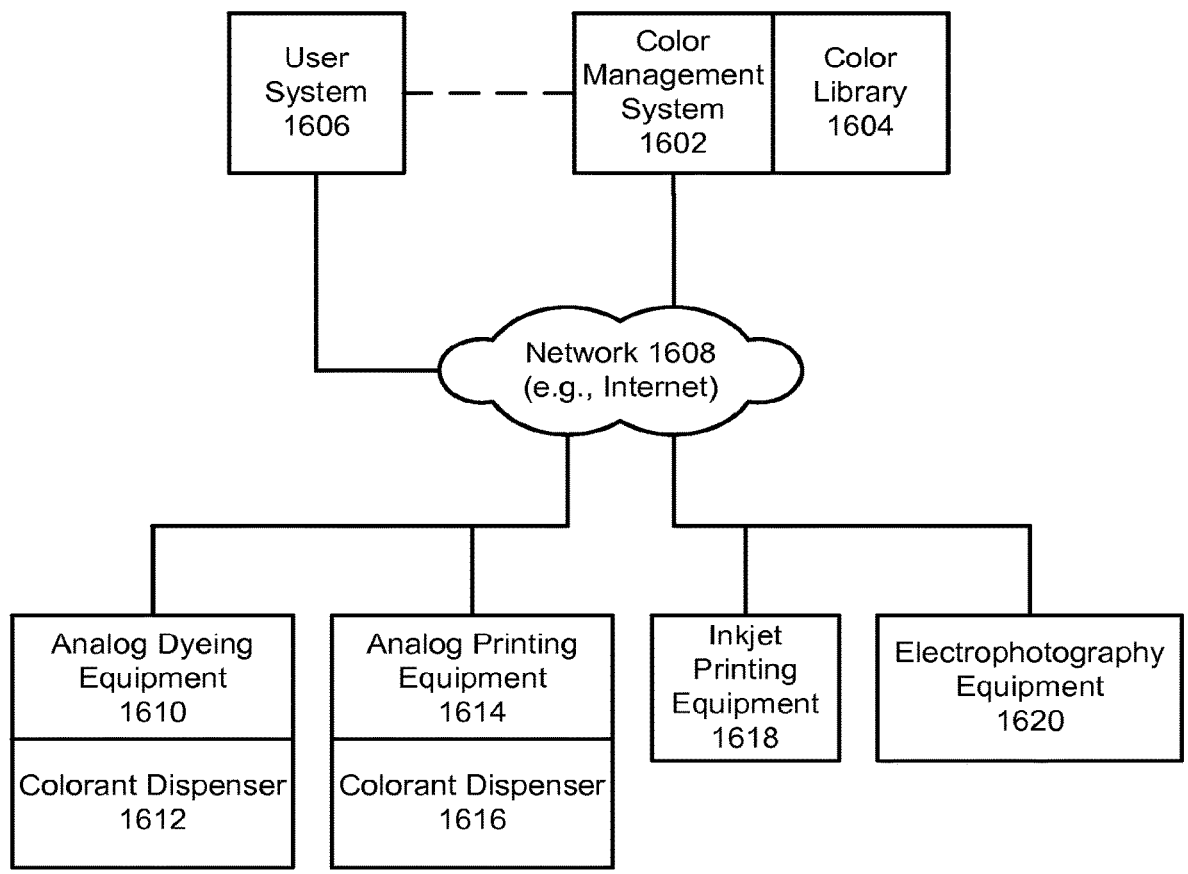
FIG. 16 is a diagram of an example colorant dispenser environment in accordance with some implementations.

FIG. 16 is a diagram of an example colorant dispenser environment 1600 in accordance with some implementations. The environment 1600 includes a color management system 1602, a color library 1604 (optional), a user system 1606 (optional), a network 1608, analog dyeing equipment 1610 and its associated colorant dispenser 1612, analog printing equipment 1614 and its associated colorant dispenser 1616, inkjet printing equipment 1618 and electrophotography equipment 1620.

The analog dyeing equipment 1610 can include, but is not limited to one or more of exhaustion piece dyeing equipment, continuous dyeing equipment, batch dyeing equipment, and foam dyeing equipment. The analog printing equipment can include one or more of gravure roller, rotary screen and offset printing systems. The colorant dispensers (1612 and 1616) associated with the analog equipment can be conventional colorant dispensers (e.g., for dispensing spot color) that may only dispense colorants according to a recipe (e.g., a recipe provided in an instruction/metadata file from the color management system 1602 as described herein).

Figure 17:
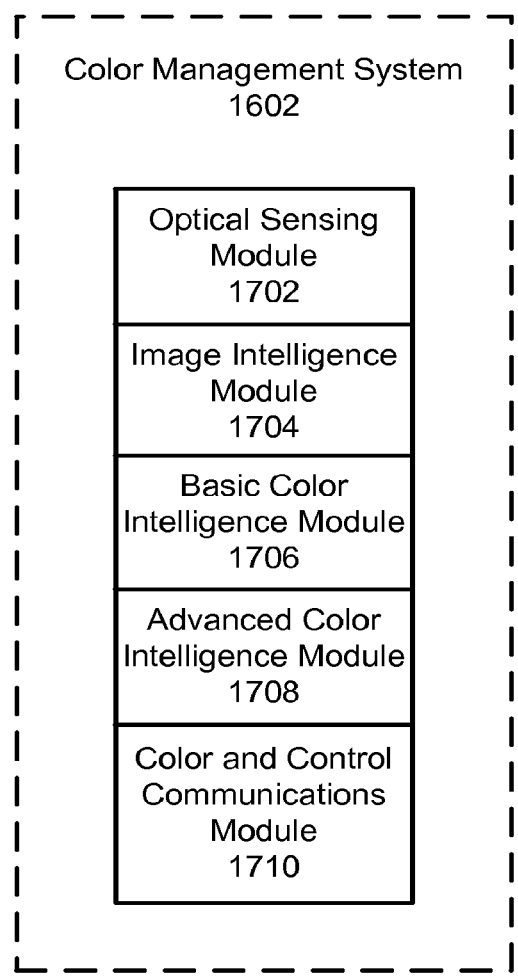
FIG. 17 is a diagram of an example color management system in accordance with some implementations.

FIG. 17 is a diagram showing details of an example color management system (1602) in accordance with some implementations. The color management system 1602 includes an optical sensing module 1702, an image intelligence module 1704, a basic color intelligence module 1706, an advanced color intelligence module 1708 and a color/control communications module 1710.

The optical sensing module 1702 can include an optical sensor (connected locally or remotely to the color management computer system) for color measurement of light reflecting surface objects (e.g., spectral reflectance factors $(R(\lambda))$/CIELAB values) or light transmitting objects (e.g., spectral transmittance $(T(\lambda))$/CIELAB values) or light from self-luminous objects such as a monitor (e.g., spectral power distribution $(E(\lambda))$) or image measurement of designs (e.g., an image file in a file format such as TIFF or the like) in order to collect useful information for color management that can include colorant build-up data, color targets/color library data, and design image data files for color separation.

The image intelligence module 1704 can be configured to perform design image color separation to create color separated gray scale files as well as to perform image manipulations for image dithering, image compression and image encryption.

The basic color intelligence module 1706 can create solid color recipes for images with a uniform single color for conventional spot color analog dyeing including piece dyeing, continuous dyeing, batch dyeing and foam dyeing. Alternatively, the spot color dyeing can be carried out by spot color digital dyeing operation including digital ink-jet system and digital electrophotography system. The later digital system is itself a very accurate colorant dispensing system. The basic color intelligence module 1706 can also create layer by layer color recipes for color separated print images for conventional analog print operations including gravure roller printing, rotary screen printing and offset printing.

The advanced color intelligence module can create layer by layer enhanced color recipes for appearance reproduction among multiple digital printing systems or between digital and analog printing systems. In the former case, the colorant build-up intelligence can permit the multiple digital printing systems to print as one single printing system with a high level of color reproduction. In the later case, the layer by layer enhanced color recipes manage the color appearance reproduction between digital and analog printing systems with accurate reproduction with respect to color fall-on, tonal appearance, and opacity effect. In this method, the volume of dispensed colorants/chemicals can be controlled accurately along with a precise location of the dispensing. Thus, a digital printing machine can become a dispensing system with both volume and location control. This level of control can be implemented to accurately control color through the volume of colorants applied to the substrate. The method of addressing a digital print machine as a dispensing system can also provide an accurate volume and location of any chemistry that is jettable with current inkjet nozzle configuration in an output device. This capability may be of particular value when dispensing chemistries that may impart additional performance to the final product through ink-jet nozzles.

The color/control communications module 1710 can forward relatively small instruction/metadata files (e.g., created through processing at 1702-1708) throughout a digital supply chain for digital print/color marketing and production. Such intelligence can help assure digital supply chain integrity with knowledge including images, color, colorants, substrates, machines, processes, and customers. By coordinating the various levels of intelligence with various color dispensers via the Internet, an implementation can create new opportunities in mass customization and e-commerce for globalized product development and production. In short, an implementation can help maximize benefits provided by both analog and digital color dispensing/application technologies.

In one operational example, a designer for a large retail store measures color (e.g., via user system 1606) and specifies the measured reflectance as the formulation target to a color management system (e.g., sends color measurements to a color management system 1602 via the Internet 1608) to perform color matching. The color management system 1602 can perform color matching as discussed above and provide a recipe to an output device (e.g., 1610, 1614, 1618 and/or 1620), which can then, in turn, produce the fabric according to the specified color at different production sites using different output devices via the internet in a coordinated and color consistent manner.

In another operational example, a color specifier (e.g., a designer for a clothing company) submits a physical color and its measured reflectance as color target to a color management system 1602, which can then, in turn, match the color and provide an instruction/metadata file to an output device (e.g., a mill for yardage reproduction as color standards for distribution to a number of global suppliers).

In still another operational example, a converter submits design and color specifications (e.g., to a color management system 1602, via the Internet 1608) from user system for a short run reproduction for market testing.

In yet another operational example, a hotel chain design manager submits colors as targets for reproduction on both textile substrate and coating substrate to remodel hotel rooms in its global hotel chains. The color management system can perform color matching between the color targets and each of the two or more output devices for the textile equipment and the coating substrate equipment.

In another operation example, a cut and sew operator receives an order from a customer along with design specifications of a fashion design for an in-house short run reproduction. The color management system 1602 can receive the design and color specifications and performs color matching as described herein. The color management system 1602 can forward any colorant recipes to one or more of the output devices (e.g., 1610, 1614, 1618 and/or 1620) for producing the fashion design.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering, colorant matching/dispensing and textile printing and dyeing arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for color management.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising transmitting colorant dispensing data to a colorant dispenser, the colorant dispensing data including:
   one or more layer files each specifying a color of one or more pixels, and
   one or more colorant recipes, each colorant recipe corresponding to a layer file, wherein the colorant recipe is generated based on one or more buildup curves associated with a combination that includes each of a substrate, one or more colorants, and the colorant dispenser, the one or more buildup curves specifying optical characteristics of prints generated using the combination, each layer file and corresponding colorant recipe configured to be effective to cause the colorant dispenser to dispense a respective colorant of the one or more colorants onto the substrate at a location specified by each of the one or more pixels of each corresponding layer file.

2. The method of claim 1, wherein the colorant dispenser comprises:
   a spectrophotometer; and
   one or more processors coupled to the spectrophotometer and configured to dispense an amount of a chemical at a specified location of the substrate via the colorant dispenser and based on at least one of the one or more colorant recipes generated based on the one or more buildup curves.

3. The method of claim 2, wherein the chemical is the colorant.

4. The method of claim 2, wherein the amount of the chemical is determined based on a colorant recipe of the one or more colorant recipes determined responsive to a spectral measurement from the spectrophotometer.

5. The method of claim 2, wherein the substrate is non-moving with respect to the dispenser.

6. The method of claim 2, wherein the substrate is moving with respect to the dispenser.

7. The method of claim 2, wherein the location is specified in terms of pixel values in the one or more layer files.

8. A system comprising one or more processors configured to perform operations comprising:
   transmitting colorant dispensing data to a colorant dispenser, the colorant dispensing data including:
   one or more layer files each specifying a color of one or more pixels, and
   one or more colorant recipes, each colorant recipe corresponding to a layer file, wherein the colorant recipe is generated based on one or more buildup curves associated with a combination that includes each of a substrate, one or more colorants and the colorant dispenser, the one or more buildup curves specifying optical characteristics of prints generated using the combination, each layer file and corresponding colorant recipe configured to be effective to cause the colorant dispenser to dispense a respective colorant of the one or more colorants onto the substrate at a location specified by each of the one or more pixels of each corresponding layer file.

9. The system of claim 8, wherein the colorant dispenser comprises:
a spectrophotometer coupled to the one or more processors; and
wherein the one or more processors are configured to dispense an amount of a chemical at a specified location of the substrate via the colorant dispenser and based on at least one of the one or more colorant recipes generated based on the one or more buildup curves.

10. The system of claim 9, wherein the chemical is the colorant.

11. The system of claim 9, wherein the amount of the chemical is determined based on a colorant recipe of the one or more colorant recipes determined responsive to a spectral measurement from the spectrophotometer.

12. The system of claim 9, wherein the substrate is non-moving with respect to the dispenser.

13. The system of claim 9, wherein the substrate is moving with respect to the dispenser.

14. The system of claim 9, wherein the location is specified in terms of pixel values in the one or more layer files.

15. A nontransitory computer readable medium having stored thereon instructions that, when executed by one or more processors, cause the processors to perform operations comprising:
transmitting colorant dispensing data to a colorant dispenser, the colorant dispensing data including:
one or more layer files each specifying a color of one or more pixels, and
one or more colorant recipes, each colorant recipe corresponding to a layer file, wherein the colorant recipe is generated based on one or more buildup curves associated with a combination that includes each of a substrate, one or more colorants and the colorant dispenser, the one or more buildup curves specifying optical characteristics of prints generated using the combination, each layer file and corresponding colorant recipe configured to be effective to cause the colorant dispenser to dispense a respective colorant of the one or more colorants onto the substrate at a location specified by each of the one or more pixels of each corresponding layer file.

16. The nontransitory computer readable medium of claim 15, wherein the colorant dispenser comprises:
a spectrophotometer coupled to the one or more processors; and
wherein the one or more processors are configured to dispense an amount of a chemical at a specified location of the substrate via the colorant dispenser and based on at least one of the one or more colorant recipes generated based on the one or more buildup curves.

17. The nontransitory computer readable medium of claim 16, wherein the chemical is the colorant.

18. The nontransitory computer readable medium of claim 16, wherein the amount of the chemical is determined based on a colorant recipe of the one or more colorant recipes determined responsive to a spectral measurement from the spectrophotometer.

19. The nontransitory computer readable medium of claim 16, wherein the substrate is non-moving or moving with respect to the dispenser.

20. The nontransitory computer readable medium of claim 16, wherein the location is specified in terms of pixel values in the one or more layer files.

* * * * *